United States Patent
Matsuo

(10) Patent No.: US 10,516,471 B2
(45) Date of Patent: Dec. 24, 2019

(54) WIRELESS COMMUNICATION DEVICE AND WIRELESS COMMUNICATION METHOD

(71) Applicant: KABUSHIKI KAISHA TOSHIBA, Tokyo (JP)

(72) Inventor: Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 278 days.

(21) Appl. No.: 15/392,424

(22) Filed: Dec. 28, 2016

(65) Prior Publication Data

US 2017/0272146 A1    Sep. 21, 2017

(30) Foreign Application Priority Data

Mar. 16, 2016    (JP) .................................. 2016-052902

(51) Int. Cl.

| | | |
|---|---|---|
| H04B 7/15 | (2006.01) | |
| H04W 76/14 | (2018.01) | |
| H04W 12/06 | (2009.01) | |
| H04W 72/04 | (2009.01) | |
| H04B 7/155 | (2006.01) | |
| H04W 12/08 | (2009.01) | |
| H04W 74/08 | (2009.01) | |
| H04W 84/18 | (2009.01) | |

(52) U.S. Cl.
CPC .......... *H04B 7/15* (2013.01); *H04B 7/15542* (2013.01); *H04W 12/06* (2013.01); *H04W 72/04* (2013.01); *H04W 76/14* (2018.02); *H04W 12/08* (2013.01); *H04W 74/0816* (2013.01); *H04W 84/18* (2013.01)

(58) Field of Classification Search
CPC ..... H04B 7/15; H04B 7/15542; H04W 76/14; H04W 72/04; H04W 12/06; H04W 84/18; H04W 74/0816; H04W 12/08
See application file for complete search history.

(56) References Cited

U.S. PATENT DOCUMENTS

| | | |
|---|---|---|
| 6,947,768 B2 | 9/2005 | Adachi et al. |
| 7,209,746 B1 | 4/2007 | Kirino et al. |

(Continued)

FOREIGN PATENT DOCUMENTS

| | | |
|---|---|---|
| GB | 2491335 A | 12/2012 |
| JP | H11-346356 A | 12/1999 |

(Continued)

OTHER PUBLICATIONS

Stacey, Robert: "Specification Framework for TGax", IEEE 11-15-0132-15-00ax-spec-framework, Intel, Jan. 2016, pp. 1-43.

(Continued)

*Primary Examiner* — Walter J Divito

(74) *Attorney, Agent, or Firm* — Foley & Lardner LLP

(57) ABSTRACT

According to one embodiment, a wireless communication device includes: a receiver configured to receive a first frame which contains data; and a transmitter configured to transmit a second frame and a third frame by frequency multiplexing, the second frame containing the data and being addressed to a first relay station different from a sender device of the first frame, and the third frame being addressed to a first wireless communication device different from the first relay station.

13 Claims, 21 Drawing Sheets

(56) References Cited

U.S. PATENT DOCUMENTS

| | | |
|---|---|---|
| 2009/0235138 A1 | 9/2009 | Chang |
| 2010/0014463 A1 | 1/2010 | Nagai |
| 2010/0271999 A1 | 10/2010 | Yu |
| 2012/0231797 A1* | 9/2012 | Van Phan .......... H04B 7/15592 455/437 |
| 2015/0358067 A1 | 12/2015 | Zhang et al. |
| 2018/0255568 A1* | 9/2018 | Takeda .................. H04W 28/06 |

FOREIGN PATENT DOCUMENTS

| | | |
|---|---|---|
| JP | 3774469 B2 | 5/2006 |
| JP | 2009-239542 A | 10/2009 |
| JP | 2014-107670 A | 6/2014 |

OTHER PUBLICATIONS

Stacey, Robert: "Specification Framework for TGax", IEEE 11-15-0132-17-00ax-spec-framework, Intel, May 2016, pp. 1-61.

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™, The Institute of Electrical and Electronics Engineers, Inc., Dec. 2013, pp. 1-425.

Non-Final Office Action on U.S. Appl. No. 15/919969, dated Jun. 27, 2019.

\* cited by examiner

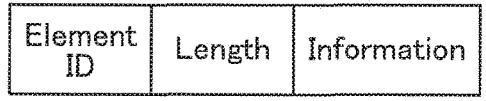
FIG. 4
| To DS | From DS | Address 1 | Address 2 | Address 3 | | Address 4 | |
|---|---|---|---|---|---|---|---|
| | | | | MSDU case | A-MSDU case | MSDU case | A-MSDU case |
| 0 | 0 | RA=DA | TA=SA | BSSID | BSSID | N/A | N/A |
| 0 | 1 | RA=DA | TA=BSSID | SA | BSSID | N/A | N/A |
| 1 | 0 | RA=BSSID | TA=SA | DA | BSSID | N/A | N/A |
| 1 | 1 | RA | TA | DA | BSSID | SA | BSSID |
FIG. 5
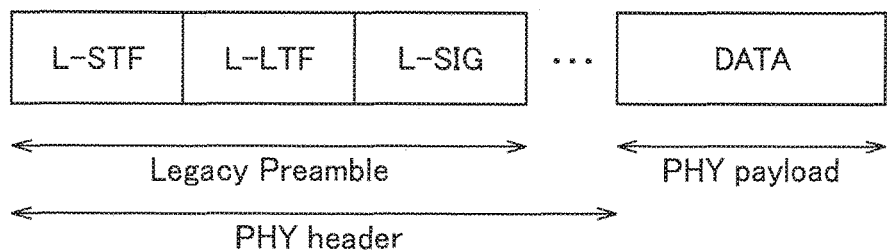
FIG. 6

| Frame Control | Duration /ID | Address 1 | Address 2 | Common Info | Per User Info 1 | Per User Info 2 | ... | Per User Info n | FCS |

FIG. 14

# WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2016-052902, filed on Mar. 16, 2016, the entire contents of which are incorporated herein by reference.

FIELD

Embodiments of the present invention relate to a wireless communication device and a wireless communication method.

BACKGROUND

In an environment where there mixedly exist access points connected with a wired network and access points not connected with the wired network, a mesh network has been known as a system that sequentially forwards frames received from a terminal between the access points. In the mesh network, forwarding among the access points is carried out in a time-staggered manner so that a time to be taken until the forwarding to the access point is made depends on the number of hops from the access point connected with the wired network.

In order that the access point as a relay station simultaneously performs receiving of frames from another access point and transmitting of frames to a terminal, a scheme has been proposed that both a 2.4 GHz band and a 5 GHz band are used. This scheme needs to use two bands. There is no proposal regarding how achieve forwarding in a case where the forwarding is made via more relay stations.

BRIEF DESCRIPTION OF THE DRAWINGS

FIG. 4 is a diagram showing a format of an information element;

FIG. 5 a diagram showing an example of a table of a setting rule for Address 1 to Address 4 fields;

FIG. 6 a diagram showing an exemplary structure of a physical packet;

FIG. 14 is a diagram showing an exemplary format of a trigger frame;

DETAILED DESCRIPTION

According to one embodiment, a wireless communication device includes: a receiver configured to receive a first frame which contains data; and a transmitter configured to transmit a second frame and a third frame by frequency multiplexing, the second frame containing the data and being addressed to a first relay station different from a sender device of the first frame, and the third frame being addressed to a first wireless communication device different from the first relay station.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
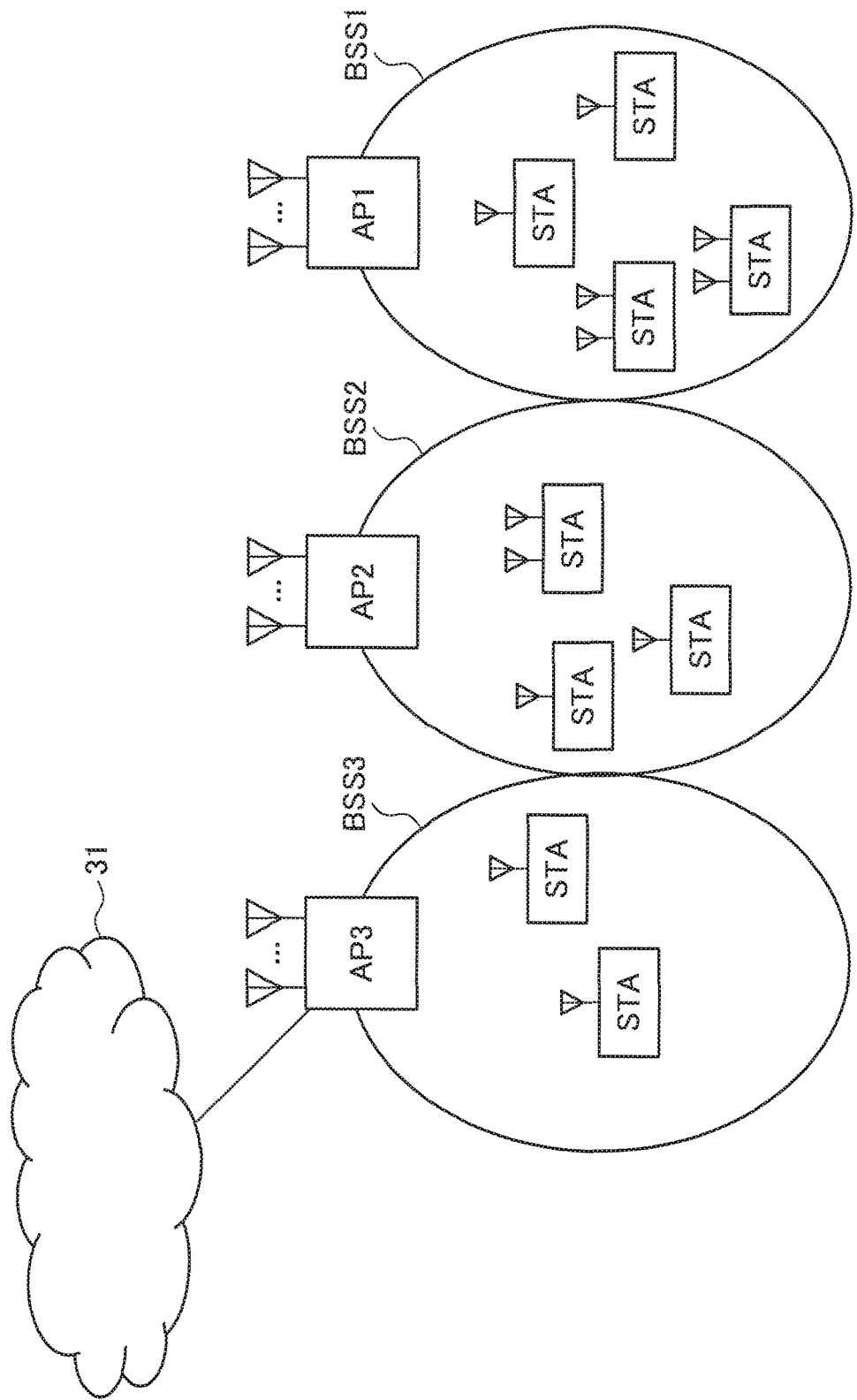
FIG. 1 is a diagram showing a wireless communication system according to a first embodiment.

FIG. 1 is a diagram showing a wireless communication system according to a first embodiment. The wireless communication system in FIG. 1 includes access points (relay station) 1, 2, and 3 which are each a base station. The access points 1 to 3 form BSSs (BSS: Basic Service Set) 1, 2 and 3, respectively which are each a wireless communication group or a wireless communication network. A plurality of wireless communication terminals belong to the BSSs 1 to 3. The wireless communication terminal may be referred to as a terminal, a wireless terminal, or a station (STA) in some cases. The access points 1 to 3 each are also one form of the terminal except for having a relay function. Note that there may exist a control station for controlling the access points 1 to 3.

The access points 1 to 3 wirelessly communicate with the plural terminals belonging to the BSSs of the respective access points in accordance with any wireless communication scheme. As an example, the communication complying with the IEEE802.11 standard is carried out. A wireless communication device equipped in the terminal communicates with a wireless communication device equipped in an access point. The wireless communication device equipped in the access point communicates with the wireless communication device equipped in the terminal. A wireless LAN based on the IEEE802.11 standard is assumed for the wireless communication system in the embodiment without limitation.

The terminals belonging to the BSSs 1 to 3 can communicate with the access points 1 to 3 managing the BSSs 1 to 3, respectively. The access points 1 to 3 can also communicate with each other. For example, the access point 1 can communicate with the access points 2 and 3, and the access point 2 can communicate with the access points 1 and 3. The access point 1 is adjacent to the access point 2, and the access point 2 is adjacent to the access points 1 and 3.

The access point 3 is connected with a wired network 31. The wired network 31 may be a LAN such as the Ethernet or a wide area network such as the Internet. In order that the terminals belonging to the access points 1 to 3 transmit data to the wired network 31, the data is necessary to be routed through the access point 3. For example, in order that the terminal belonging to the BSS 1 transmits the data to the wired network 31, it is necessary that the terminal transmits a frame containing the data to the access point 1, the access point 1 relays the frame containing the data to the access point 2, and further that the access point 2 relays the frame containing the data to the access point 3. The access point 3 is located on the most upstream side and the access point 1 is located on the most downstream side.

Figure 2:
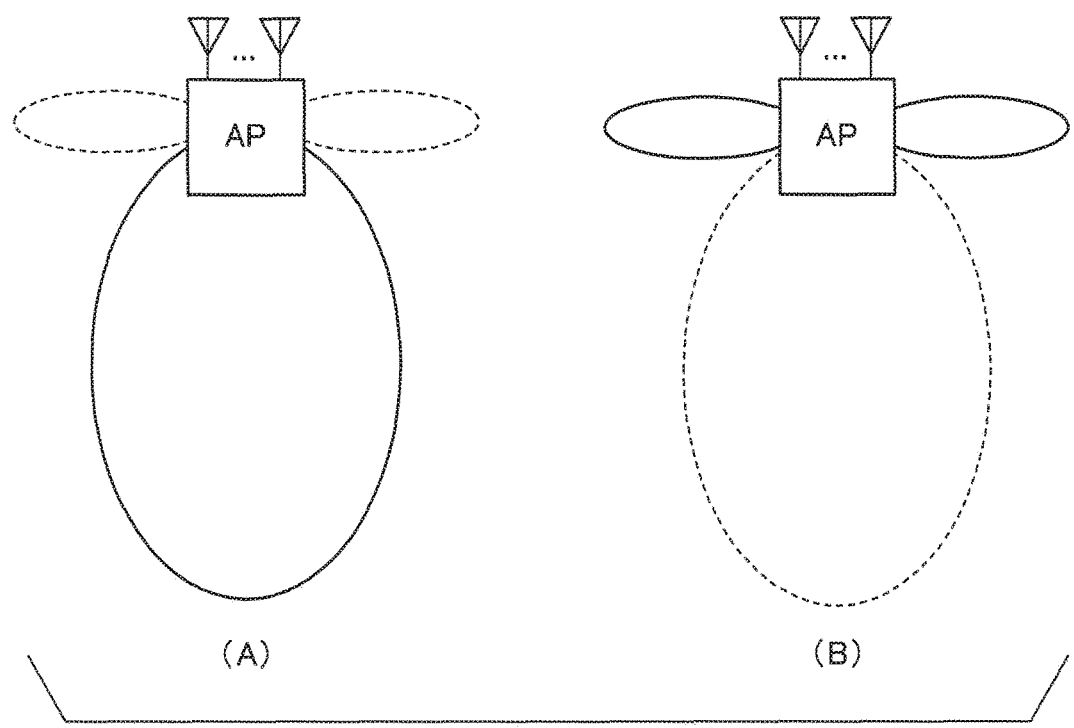
FIG. 2 is a diagram showing an example of a directivity control for an antenna of an access point.

The access points 1 to 3 include one or more antennas. In the example in FIG. 1, the access points 1 to 3 respectively include two or more antennas. The number of antennas provided to the access point may be more or less than that described above. Each of the terminals includes one or more antennas. The antenna of the access point may be configured to have directivity controllable. As an example, as shown in FIG. 2(A), the directivity in a direction for the terminals belonging to the BSS of the own access point and the directivity in a direction for the access point adjacent thereto may be switchable. The antenna of the access point may have a directivity in all directions (omnidirectional directivity) in which a directivity in a particular direction is not specified. The omnidirectional directivity and the directivity shown in FIG. 2(A) or FIG. 2(B) may be switchable to each other. As a way to switch the directivity, a plurality of antennas having a plurality of directivity types may be provided to switch the antenna to be used. In addition, an antenna having a plurality of branches may be used to make the directivity to be switchable by controlling an impedance or resistance of each branch. Other method than those described here may be used to control the directivity.

The terminal can belong to the BSS of the access point by connecting with the access point by way of an association process. The connection means a state where a wireless link is established, and a parameter required for the communication is completely exchanged by way of the association process with the access point so as to establish the wireless link. The terminal establishing the wireless link has an Association ID (AID) allocated from the access point. The AID is an identifier given in the association process which is performed between the terminal and the access point in order that the terminal belongs to the BSS of the access point. More specifically, in a case where the access point authorizes the terminal that transmitted a connection request (Association Request) frame to connect therewith, it allocates a number which is generated locally in the relevant network to the terminal. The number is what is called the AID, and a certain number in a specified range other than 0 is allocated. The AID is allocated so as to be unique in that network (BSS). The AP transmits a connection response (Association Response) frame containing the allocated AID to the terminal which is to be authorized to connect therewith. The terminal grasps its AID by reading out the AID from the connection response frame. The terminal receives the connection response frame for the connection authorization from the access point to be able to belong to the BSS formed by the access point and thereafter communicate with access point. Such a process for connection between the access point and the terminal is called an association process. The AP may perform an Authentication process before the association process with the terminal. The access point can identify the terminal connected with itself by means of the AID or a MAC address.

Figure 3:
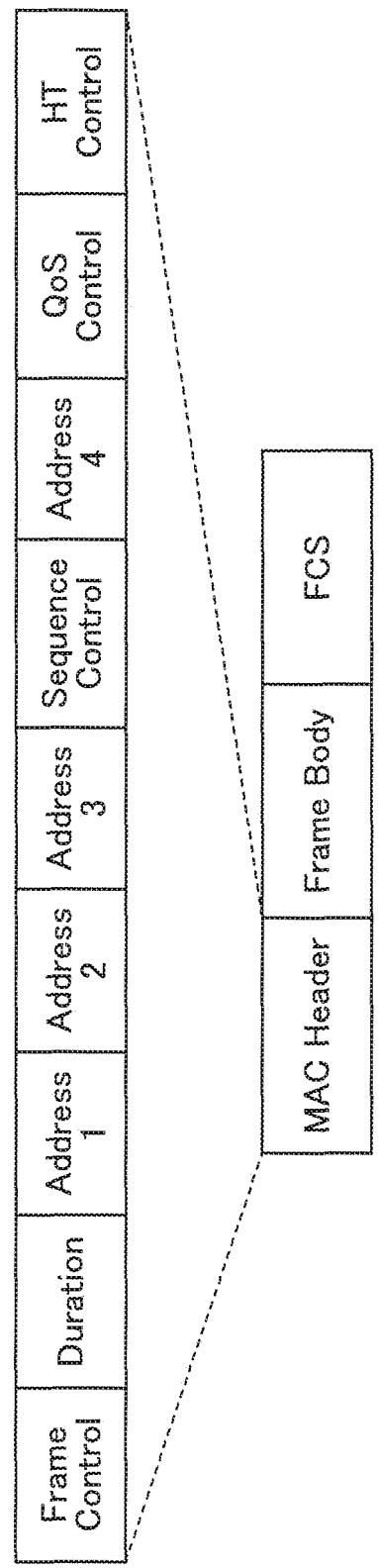
FIG. 3 is a diagram showing an exemplary basic format of a MAC frame.

FIG. 3 illustrates the basic exemplary format of the MAC frame. The data frame, the management frame, and the control frame in accordance with this embodiment are based on a frame format as shown in FIG. 3. This frame format includes the fields of MAC header, Frame body, and FCS. The MAC header includes, as illustrated in FIG. 4(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 4 may exist. For example, an Address 4 field may further exist. Also, an RU/AID field which will be described later may exist in the MAC header or the frame body field.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame. The field of Address 4 is used for communication between access points. The field of Address 4 may not exist in some cases.

As described above, two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a RTS (Request to Send) frame, CTS (Clear to Send) frame, a BA (Block Ack) frame or a BAR (Block Ack Request) frame within the control frame, or a beacon frame within the management frame is made by the Subtype field.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector).

The QoS control field is used to carry out QoS control to carry out transmission with the priorities of the frames taken into account. The QoS control field includes a TID field (16 types from 0 to 15) in which an identifier is set for data traffic, and an Ack policy field in which an acknowledgement scheme is set. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT control filed is a filed introduced in IEEE 802.11n. The HT (High Throughput) control field is present when the Order field is set to 1 for QoS data frame or a management frame. The HT control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

In the management frame, an information element (Information element; IE) to which a unique Element ID (IDentifier) is assigned is set in the Frame Body field. One or a plurality of information elements may be set in the frame body field. The information element has, as illustrated in FIG. 5, the fields of an Element ID field, a Length field, and an Information field. The information element is discriminated by the Element ID. The Information field is adapted to store the content of the information to be notified, and the Length field is adapted to store the length information of the information field. In the management frame, predefined one or more fields may be arranged depending on the frame type (Subtype) other than the information element.

Frame check sequence (FCS) information is set in the FCS field as a checksum code for use in error detection of the frame on the reception side. As an example of the FCS information, CRC (Cyclic Redundancy Code) may be mentioned.

The content of the addresses set in the fields of Address 1, Address 2, Address 3, and Address 4 varies depending on whether the frame is transmitted to the base station or transmitted from the base station, whether the frame is an MSDU (MAC Service Data Unit) or an A-MSDU (A(Aggregated)-MSDU), and so forth.

Here, the MSDU denotes data (frame body part) in the MAC frame that is an MPDU (Medium access control (MAC) Protocol Data Unit). The A-MSDU denotes a configuration in which the MSDUs that are a plurality of data payloads are conjunct in the frame body of one MPDU. The expression, such as MSDU, A-MSDU, and MPDU, is a way of calling in the IEEE 802.11 standard.

FIG. 5 shows an example of a table showing the content set in the fields of Address 1, Address 2, Address 3, and Address 4. The table is extracted from IEEE 802.11 specifications. The number and definition of the Address fields defined in the frame header may vary according to the type or standard of the protocol used, and in that case, the content of the addresses set in the Address fields do not have to follow the table.

A "To DS" bit and a "From DS" bit in the table of FIG. 6 correspond to bits set in subfields of To DS and From DS of the Frame Control field. A bit "1" is set in "To DS" when the frame is to be transmitted to the base station, and a bit "0" is set in other cases. A bit "1" is set in "From DS" when the frame is to be transmitted from the base station, and "0" is set in other cases.

A setting example of an uppermost line ("To DS"=0, "From DS"=0) indicates a frame directly transmitted from a terminal to another terminal in the same BSS. In this case, the address (MAC address) of the terminal (the other terminal) that is the direct destination of the transmitted frame is set for the receiver address (Receiver Address; RA) in the Address 1 field. Other than the address of the terminal (unicast address), a broadcast address or a multicast address may be set for the RA (the same applies hereinafter). In the Address 2 field, an SA (Source Address) is set for the transmitter address (Transmitter Address; TA). The SA is an address of the terminal that is the first transmitter at the start of forwarding of the frame. Here, the SA is the address of the terminal. The BSSID (Basic Service Set IDentifier) (may be wildcard BSSID for putting "1" into all bits and targeting all BSSIDs) that is the identifier of the BSS is set in the Address 3 field. The Address 4 field is not used.

A setting example of a second line ("To DS"=0, "From DS"=1) indicates a frame transmitted from a base station (BSS) to a terminal belonging to the base station (BSS). In this case, the address (MAC address) of the terminal of the receiver is set for the RA in the Address 1 field. In the Address 2 field, the BSSID of the base station that is the transmitter is set for the TA. The SA (Source Address) or the BSSID is set in the Address 3 field according to whether the frame includes the MSDU or the A-MSDU. The Address 4 field is not used.

A setting example of a third line ("To DS"=1, "From DS"=0) indicates a frame transmitted from a terminal belonging to a base station (BSS) to the base station. In this case, the BSSID of the base station that is the receiver is set for the RA in the Address 1 field. In the Address 2 field, the SA, that is, the address (MAC address) of the terminal, is set for the TA. In the Address 3 field, a DA (Destination Address) or the BSSID is set according to whether the frame includes the MSDU or the A-MSDU. The DA is the address of the terminal at the destination where the frame is ultimately forwarded. The Address 4 field is not used.

A setting example of a fourth line ("To DS"=1, "From DS"=1) denotes a frame of communication between base stations (BSSs). In this case, the BSSID of the base station that is the receiver is set for the RA in the Address 1 field. In the Address 2 field, the address (MAC address) of the base station that is the transmitter is set for the TA.

In the Address 3 field, the DA (Destination Address) or the BSSID is set according to whether the frame includes the MSDU or the A-MSDU. The SA or the BSSID is set in the Address 4 field according to whether the frame includes the MSDU or the A-MSDU.

The embodiment shows an example in which the terminal belonging to the BSS 1 of the access point 1 transmits the frame to be forwarded via the access points 1 and 2 to the access point 3, where in forwarding from each access point, each of the Address 1 to Address 4 fields of the MAC header may be rewritten into an adequate address (or BSSID) in accordance with the above described rule.

Here, the frame transmitted by the access point and the frame transmitted by the terminal each actually have a physical header (PHY header) added to a head of the frame, and a physical packet including the physical header and the frame is transmitted. The physical packet may be referred to as the physical frame.

FIG. 6 shows an exemplary format of the physical packet. The physical packet includes the physical header and a PHY payload. The physical header contains a Legacy Preamble part and a Preamble part depending on various standards such as 11n, 11ac, or 11ax. The PHY payload is a data part and contains a frame having been subjected to a modulation process. The Legacy Preamble has the same structure as the physical header defined by the IEEE802.11a and contains fields of an L-STF, an L-LTF, and an L-SIG. The L-STF or the L-LTF represents a known bit pattern. These are used for a device on the reception side to carry out reception gain adjustment, timing synchronization, channel estimation and the like. The L-SIG includes information for calculating by the device on the reception side a time required for transmitting the subsequent Preamble part and PHY payload.

Here, each of the access points 1 to 3 in the embodiment can implement an OFDMA (Orthogonal Frequency Division Multiple Access) with the terminals belonging to its own BSS and the other access points than itself. Here, in the OFDMA scheme, the frequency components are defined as resource units each including one or a plurality of subcarriers, and the resource units are allocated to the terminals (at least one of which may refer to an access point), and transmissions to the plurality of terminals or receptions from the plurality of terminals are simultaneously performed. A resource unit may refer to a sub-channel, a resource block or a frequency block etc. A downlink OFDMA is described as DL-OFDMA and an uplink OFDMA is described as UL-OFDMA.

Figure 7:
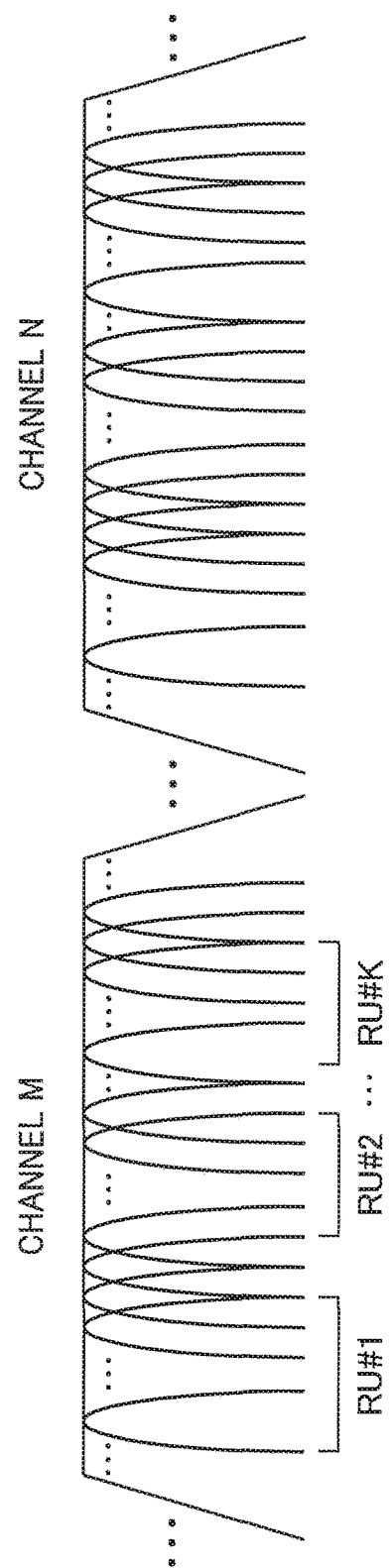
FIG. 7 is a diagram illustrating resource unit allocation.

The resource unit is a smallest unit of a resource for performing communication. FIG. 7 illustrates the resource units (RU#1, RU#2 . . . RU#K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. An OFDMA communication is realized by different resource units being simultaneously used by different terminals.

Figure 8:
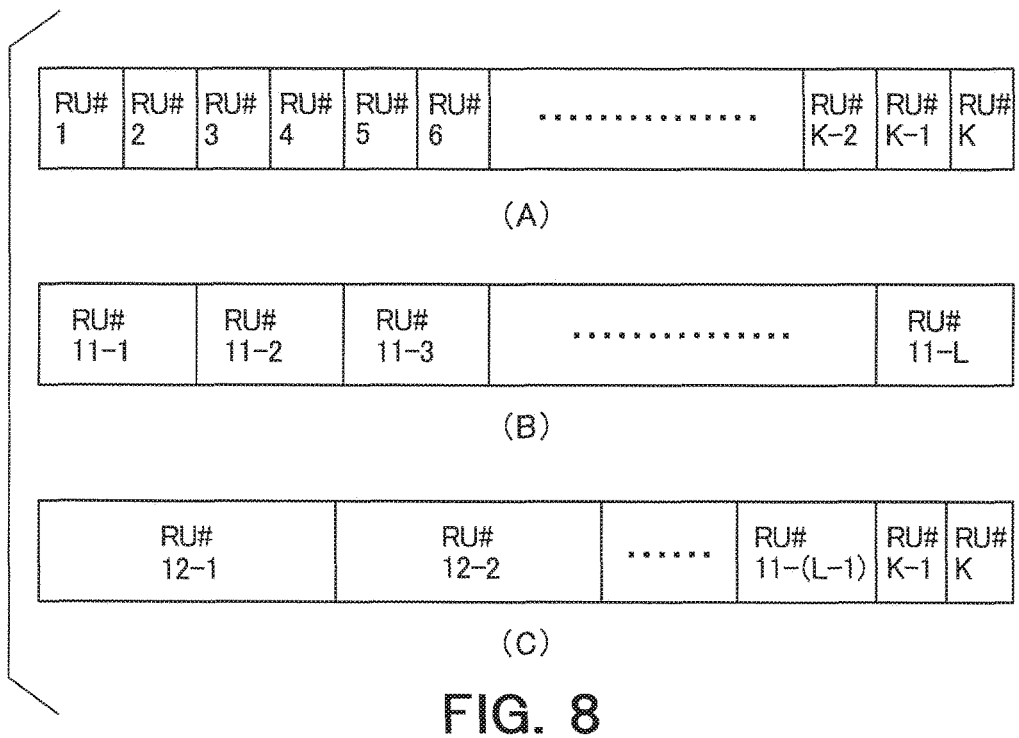
FIG. 8 is a diagram illustrating an arrangement of a resource unit.

The bandwidth of the resource unit (or the number of subcarriers) may be common in the respective resource units or the bandwidth (or the number of subcarriers) may be different for each resource unit. FIG. 8(A) to FIG. 8(C) each schematically show an exemplary arrangement pattern of the resource units in one channel. A landscape orientation along a paper plane corresponds to a frequency domain direction. Each pattern is given a pattern identifier and any of the patterns may be selected by the access point. The pattern shown here is an example and other various patterns may be used.

FIG. 8(A) illustrates an example where a plurality of resource units (RU#1, RU#2 . . . RU#K) having the same bandwidth are arranged, and FIG. 8(B) illustrates another example where a plurality of resource units (RU#11-1, RU#11-2 . . . RU#11-L) having a larger bandwidth than that of FIG. 8(A) are arranged. FIG. 8(C) illustrates a still another example where resource units with three types of bandwidths are arranged. The resource units (RU#12-1, RU#12-2) have the largest bandwidth, the resource unit RU#11-(L-1) has the bandwidth identical to that of FIG. 8(B), and the resource units (RU#K-1, RU#K) have the bandwidth identical to that of FIG. 8(A).

Here, the number of resource units used by each terminal is not limited to a particular value and one or a plurality of resource units may be used. When a terminal uses a plurality of resource units, a plurality of resource units that are continuous in terms of frequency may be used, and the resource units may be bonded. A plurality of resource units that are located at positions away from each other may be allowed to be used. The resource unit RU#11-1 of FIG. 8(B) may be considered as a bonded resource unit of the resource units RU#1 and RU#2 of FIG. 8(A).

It is assumed here that subcarriers within one resource unit are continuous in the frequency domain. However, resource units may be defined with use of a plurality of subcarriers that are arranged in a non-continuous manner. The channels used in OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

A specific example is illustrated. When the entire 20 MHz channel width is used, 26 resource units (tones) may be specified for the 256 subcarriers (tones) arranged within the 20 MHz channel width. In other words, nine resource units are specified in the 20 MHz channel width and the bandwidth of the resource unit becomes smaller than the 2.5 MHz width. In the case of a 40 MHz channel width, 18 resource units are specified therefor. In the case of an 80 MHz channel width, 37 resource units are specified (see doc.: IEEE 802.11-15/0330r5). When this is extended, for example, in the case of a 160 MHz channel width or an 80+80 MHz channel width, 74 resource units are specified. It will be appreciated that the width of the resource unit is not limited to a particular value and resource units of various sizes can be arranged.

It is assumed here that a terminal that implements OFDMA is capable of carrying out reception and decoding (including demodulation, decoding of error correcting code, etc.) of a physical packet including a frame on a channel of at least the basic channel width (20 MHz channel width if an IEEE 802.11a/b/g/n/ac standard-compliant terminal is regarded as a legacy terminal) at the legacy terminal that is to be backward compatible. With regard to the carrier sense, it is carried out in a unit of the basic channel width. The carrier sense may encompass both physical carrier sense associated with busy/idle of CCA (Clear Channel Assessment) and Virtual Carrier Sense based on medium reserve time described in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as being in the idle state by the carrier sense information are all in the idle state.

With regard to OFDMA, channel-based OFDMA is also possible in addition to the above-described resource-unit-based OFDMA. OFDMA of this case may in particular be called MU-MC (Multi-User Multi-Channel). In MU-MC, a base station assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals. The OFDMA which will be described below means the resource-unit-based OFDMA: however, an embodiment of channel-based OFDMA can also be implemented with appropriate replacement of terms and phrases in the following explanations such as reading the "resource unit" as the "channel".

Figure 9:
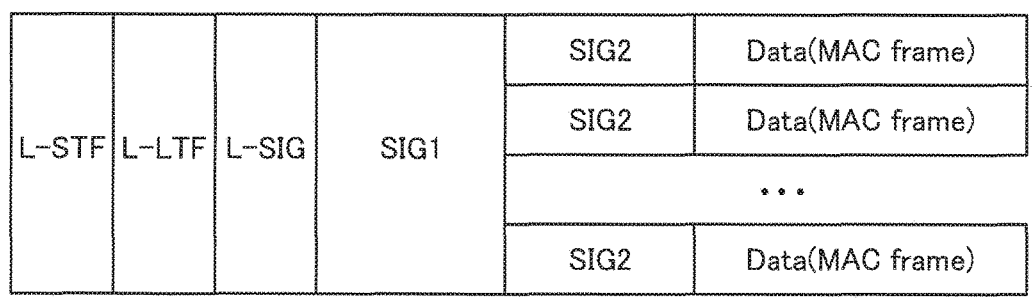
FIG. 9 is a diagram showing a schematic exemplary format of a physical packet used for DL-OFDMA transmission.

FIG. 9 shows an exemplary structure of the physical packet in a case where the frame is transmitted to a plurality of terminals (including a case of the access point) by way of the DL-OFDMA. The L-STF, L-LTF, and L-SIG fields are transmitted at a channel width of 20 MHz, as an example, and any frame for each terminal is set to the same value (same symbol). A SIG 1 field, which is set to common information for a plurality of terminals, specifies the resource unit to be used for the reception by each terminal, for example. For example, the information of the terminal identifier associated with a resource unit number (identifier) is set. The terminal identifier may be the Association ID (AID), a part of the AID (Partial AID), or other identifier such as the MAC address. The SIG 1 field is also transmitted at a channel width of 20 MHz, as an example. Any of the terminals can decode the SIG 1 field. A SIG 2 field is individually set for each resource unit and may be set to information on an MCS and the like which is required for decoding the corresponding data field, as an example. Therefore, each terminal receiving the signal from the access point can grasp, by decoding the SIG 1 field, the resource unit to be decoded by itself. Each terminal decodes the signal of the resource unit specified to itself to receive the frame.

The SIG 1 field may be set to, instead of the information of the individual terminal identifiers associated with the resource unit identifiers, an identifier of a group to which a plurality of terminals as transmission destinations belong (hereinafter, referred to as group ID). The group ID may be the same as the group ID defined by the IEEE802.11ac or the like or may be those defined differently from this. The access point groups a plurality of terminals belonging to itself (which may include other access points) to give the group ID. One terminal may belong to a plurality of group IDs. The access point, in the case of the OFDMA, targets a terminal selected from the terminals (which may include other access points) belonging to the same group ID. The access point allocates one of a plurality of user positions to the terminal for each group ID. One user position may be allocated to two or more terminals in some cases. The access point notifies the group ID the terminal belongs to and the user position allocated in the relevant group ID. The access point sets the SIG 1 field to the group ID and sets each of a plurality of user position fields to the resource unit identifier. Each of the terminals belonging to the group ID identifies the resource unit identifier specified at the user position of itself and decodes the resource unit having the relevant resource unit identifier. The terminal, if the RA of the MAC frame of the frame obtained by the decoding matches the MAC frame of the terminal, processes the obtained MAC frame, and if not the MAC address of the terminal, discards the obtained MAC address.

As another method, the access point determines for group ID which resource units the terminals belonging to the group ID should use in the OFDMA, and allocates the determined resource unit to the terminal. The access point notifies the group ID the terminal belongs to and the resource unit identifier allocated in the relevant group ID. The access point sets the SIG 1 field to the group ID. The terminal belonging to the relevant group ID decodes the resource unit allocated to itself. The terminal, if the RA of the MAC frame of the frame obtained by the decoding matches the MAC frame of the terminal, processes the obtained MAC frame, and if not the MAC address of the terminal, discards the obtained MAC address.

Note that the exemplary format in FIG. 9 is an example, and one or more other fields may be arranged before or after the SIG 2 field, or before or after the SIG 1 field. The SIG 2 field may not exist. The relevant other fields may have a bandwidth of 20 MHz or a resource unit width. All or a part of the relevant other fields may be constituted by the known symbols similar to the L-STF and the L-LTF. The SIG 1 field may correspond to an HE-SIG-A field. The SIG 2 field may correspond to a part of the HE-SIG-A field or an HE-SIG-B field, or both of these.

Figure 10:
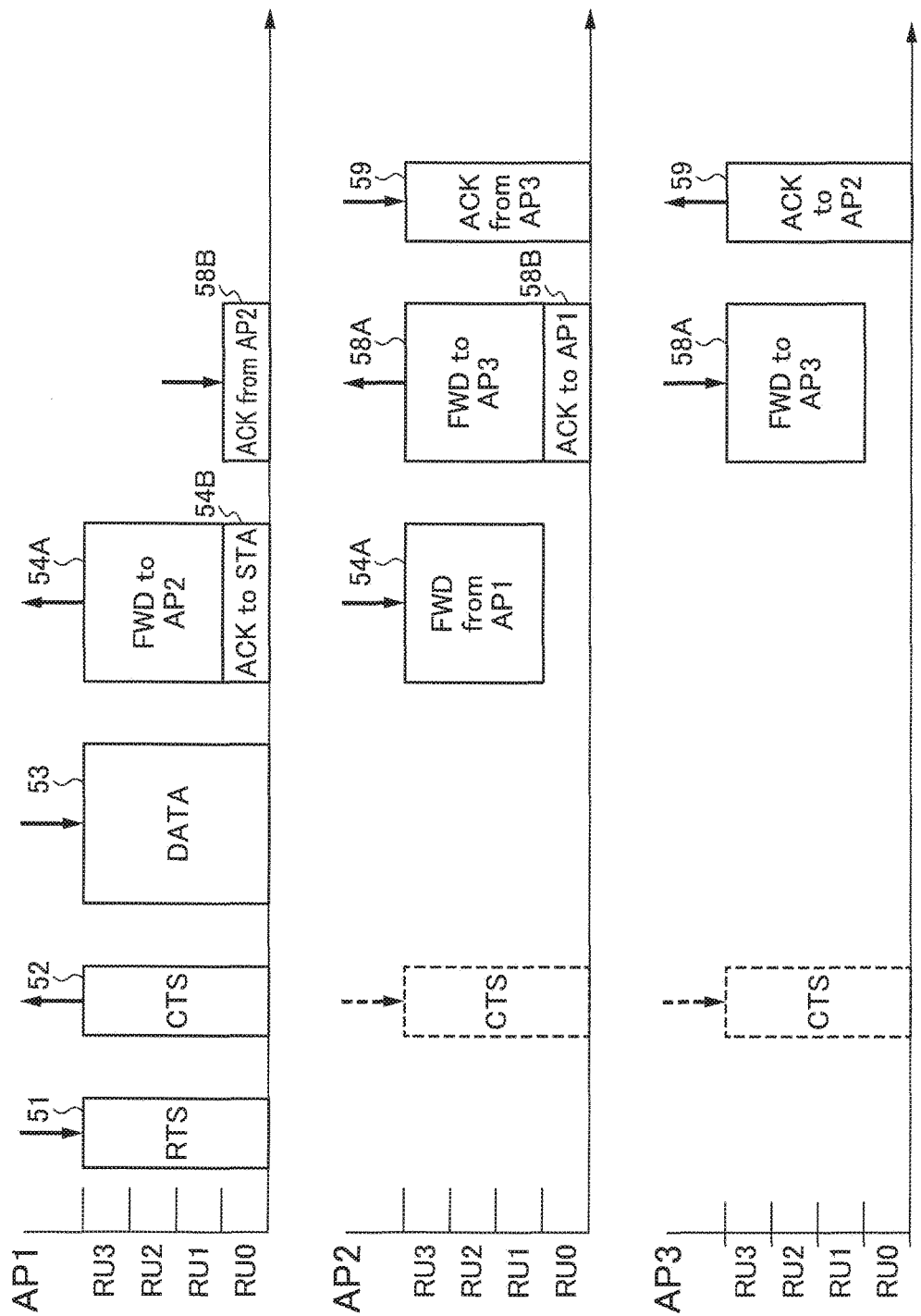
FIG. 10 is a diagram showing an exemplary sequence of a wireless communication system.

FIG. 10 is a diagram showing a first example of a sequence of the wireless communication system according to the embodiment. Here, assume a case of using one channel of 20 MHz bandwidth including resource units 1 to 4. The antenna of each access point is assumed to be set to have the omnidirectional directivity.

The access point 1 receives an RTS frame 51 from a certain terminal in the BSS 1. The RTS frame 51 is a frame requesting transmission authorization from the access point 1. An RA of the RTS frame 51 is the MAC address (BSSID) of the access point 1, and a TA is the MAC address of the terminal. A Duration/ID field of the RTS frame 51 may be set to information on a duration while the terminal wants to occupy a wireless medium. For example, there may be set to the information on a duration from the end of the RTS frame 51 until completion of receiving an ACK frame 54B. Alternatively, in the embodiment, since the access point receives an ACK frame also from the access point 2, the information on a duration until the completion of receiving an ACK frame 58B may be set. Alternatively, when the access point 1 transmits a CTS frame 52 responsive to receiving the RTS frame 51, a value of the Duration/ID field may be updated to a time period until the completion of receiving the ACK frame 58B.

The terminal acquires an access right to the wireless medium in accordance with CSMA/CA before transmitting the RTS frame 51. Specifically, the terminal performs the carrier sensing during a carrier sensing time (standby time) which is a total of a DIFS (Distributed coordination function InterFrame Space)/AIFS (Arbitration InterFrame Space) time and a backoff time determined at random. If a CCA (Clear Channel Assessment) value is equal to or less than a threshold, the medium is determined to be idle such that the access right is acquired. The terminal transmits the RTS frame 51 on the basis of the access right.

The DIFS/AIFS means any one of the DIFS and the AIFS. In a case of not QoS compliant the DIFS is meant, and in a case of QoS compliant the AIFS is meant which depends on an access category (AC) of the transmitted data. The DIFS time or the AIFS time is an example, and another time (IFS) may be used so long as it is determined in advance. The same holds for the DIFS time and the AIFS time, or an SIFS (Short InterFrame Space) which are described elsewhere herein.

Once the access point 1 receives the RTS frame 51, it transmits the CTS frame 52 after elapse of the SIFS from the completion of the receiving. An RA of the CTS frame 52 is the MAC address (TA of the RTS frame 51) of the sender terminal of the RTS frame 51. The TA may not exist. The Duration/ID field of each of the frames (including the CTS frame 52) transmitted and received during the duration which is set in the Duration/ID field of the RTS frame 51 is set by subtracting a value corresponding to a time period required for transmitting the relevant frame from the Duration/ID field of the most recently received frame. This is an example, and another method may be used to update the value of the Duration/ID field.

The CTS frame 52 transmitted by the access point 1 is received by the sender terminal of the RTS frame 51 and another terminal in the BSS 1. The CTS frame 52 may be received also by the access points 2 and 3 (see the CTS frames surrounded by a broken line in the figure). Once the sender terminal of the RTS frame 51 receives the CTS frame 52, it transmits a data frame 53 after elapse of the SIFS from that time. The data frame 53 may be an aggregation frame in which the plural data frames are aggregated (such as an A-MPDU (medium access control (MAC) protocol data unit)). Each of the frames contained in the aggregation frame may be referred to as a subframe. In a case of transmitting the aggregation frame, an acknowledgement response frame that is a response thereto is the BA frame including acknowledgement information with respect to each subframe. In a case of the data frame not the aggregation frame, the acknowledgement response frame thereto is the ACK frame.

Once the access point 1 receives the data frame 53, it transmits, after elapse of a certain time period (that may be the SIFS, or longer or shorter than the SIFS) from that time, by way of the OFDMA the acknowledgement response frame 54B (ACK frame in the figure) with respect to the relevant terminal and a data frame 54A for relaying (forwarding) the data frame 53 to the access point 2. A frame body field of the data frame 54A is set to the same value of a frame body field of the data frame 53. The address field and the like of the MAC header are adequately rewritten into those for forwarding (see FIG. 5). In a case where the end of the data frame and the end of the ACK frame do not align with each other, padding data may be added to the shorter frame (the figure shows this case).

Here, the data frame 54A transmits at a band wider than the ACK frame 54B. In the example in the figure, the ACK frame is transmitted by use of a resource unit 0 (RU 0) and the data frame 54A is transmitted by use of resource units 1 to 3 (RU 1 to RU 3). If the bandwidths of the RUs are the same as each other, the data frame 54A is transmitted at a band three times the ACK frame 54B. By doing so, a packet length for the OFDMA can be shortened. The RU 1 to RU 3 may be subjected to bonding to be used as one band (in this case, one bonded band may be used as one resource unit) or the frame may be transmitted for each of the resource units. Here is assumed the former case. As described above, in the case of the OFDMA, the frames are transmitted in a packet having a format in FIG. 9 as an example.

The packet transmitted by the access point 1 is received by the access point 2 and the relevant terminal. The terminal decodes the resource unit (RU 0) for itself to receive the ACK frame 54B. The access point 2 decodes the resource unit (RUs 1 to 3) for itself to receive the data frame 54A. The access point 2 also receives but does not decode the ACK frame 54B, and therefore, is depicted as if it does not receive the frame by use of the RU 0 in the figure.

The access point 2 transmits, after elapse of a certain time period (that may be the SIFS, or longer or shorter than the SIFS) from the completion of receiving the packet, by way of the OFDMA the ACK frame 58B with respect to the access point 1 and a data frame 58A for further relaying (forwarding) the data frame 54A to the access point 3. A frame body field of the data frame 58A is set to the same value of the frame body field of the data frame 54A. The address field and the like of the MAC header are adequately rewritten into those for transferring (see FIG. 5). Here, the data frame 58A transmits at a band wider than the ACK frame 58B. In the example in the figure, the ACK frame is transmitted by use of the resource unit 0 (RU 0) and the data frame 58A is transmitted by use of the resource units 1 to 3 (RU 1 to RU 3).

The packet transmitted by the access point 2 is received by the access point 3 and the access point 1. The access point 1 decodes the resource unit (RU 0) for itself to receive the ACK frame 58B. The access point 3 decodes the resource units (RUs 1 to 3) for itself to receive the data frame 58A. The access point 3 also receives but does not decode the ACK frame 58B, and therefore, is depicted as if it does not receive the frame by use of the RU 0 in the figure.

The access point 3 transmits, after elapse of a certain time period (that may be the SIFS, or longer or shorter than the SIFS) from the completion of receiving the packet, an ACK frame 59 with respect to the access point 2 at a channel bandwidth (single-user transmission). The access point 2 receives the ACK frame 59. Here, the ACK frame 59 is transmitted at the channel bandwidth, but in a case where there are the frame the access point 3 wants to transmit to one or more terminals in the BSS 3 at the same time as the ACK frame 59, the relevant frame and the ACK frame 59 may be transmitted by way of the OFDMA. In this case, the ACK frame 59 may be transmitted, for example, by use of the resource unit 0, and the frame directed to the terminal in the BSS may be transmitted by use of the resource units 1 to 3.

According to the above sequence, the access point 1 performs by way of the OFDMA forwarding the frame received from terminal to the access point 2 and transmitting the ACK frame to the relevant terminal. Therefore, the frame forwarding and the acknowledgement response can be efficiently carried out. The access point 2 also performs similarly by way of the OFDMA forwarding the frame received from the access point 1 to the access point 3 and transmitting the ACK frame to the access point 1. Therefore, the frame forwarding and the acknowledgement response can be efficiently carried out.

In the sequence described above, the frame transmitted to the terminal by way of the OFDMA is the acknowledgement response frame (ACK frame), but may be other frames. For example, if the terminal transmits the frame not requesting for ACK, other kinds of frames such as the data frame may be transmitted to the relevant terminal. A frame whose RA is a broadcast address (such as a management frame) may be transmitted. Alternatively, the frame directed to other terminal than the relevant terminal may be transmitted. The description here is applicable to the following other exemplary sequences.

The access point 1 may determine whether to forward the data received from the terminal, and forward to the access point 2 only the data determined to be forwarded. The data determined not to be forwarded is held in an internal memory such as a cache. In other words, the data determined to be held in the internal memory is determined not to be forwarded. For example, assume that an acquisition request is made by the terminal for a certain Web page. If the access point 1 holds data of that Web page, the acquisition request from the terminal is not forwarded. The access point 1 may read out the data held internally thereof to respond to the relevant terminal. Alternatively, if access point 2 holds the data of the relevant Web page, the access point 1 may acquire the Web data from the access point 2 to transmit to the terminal as one method. In this case also, the access point 1 determines that the acquisition request from the terminal is not forwarded. The description in this paragraph is applicable to other exemplary sequences described below.

Figure 11:
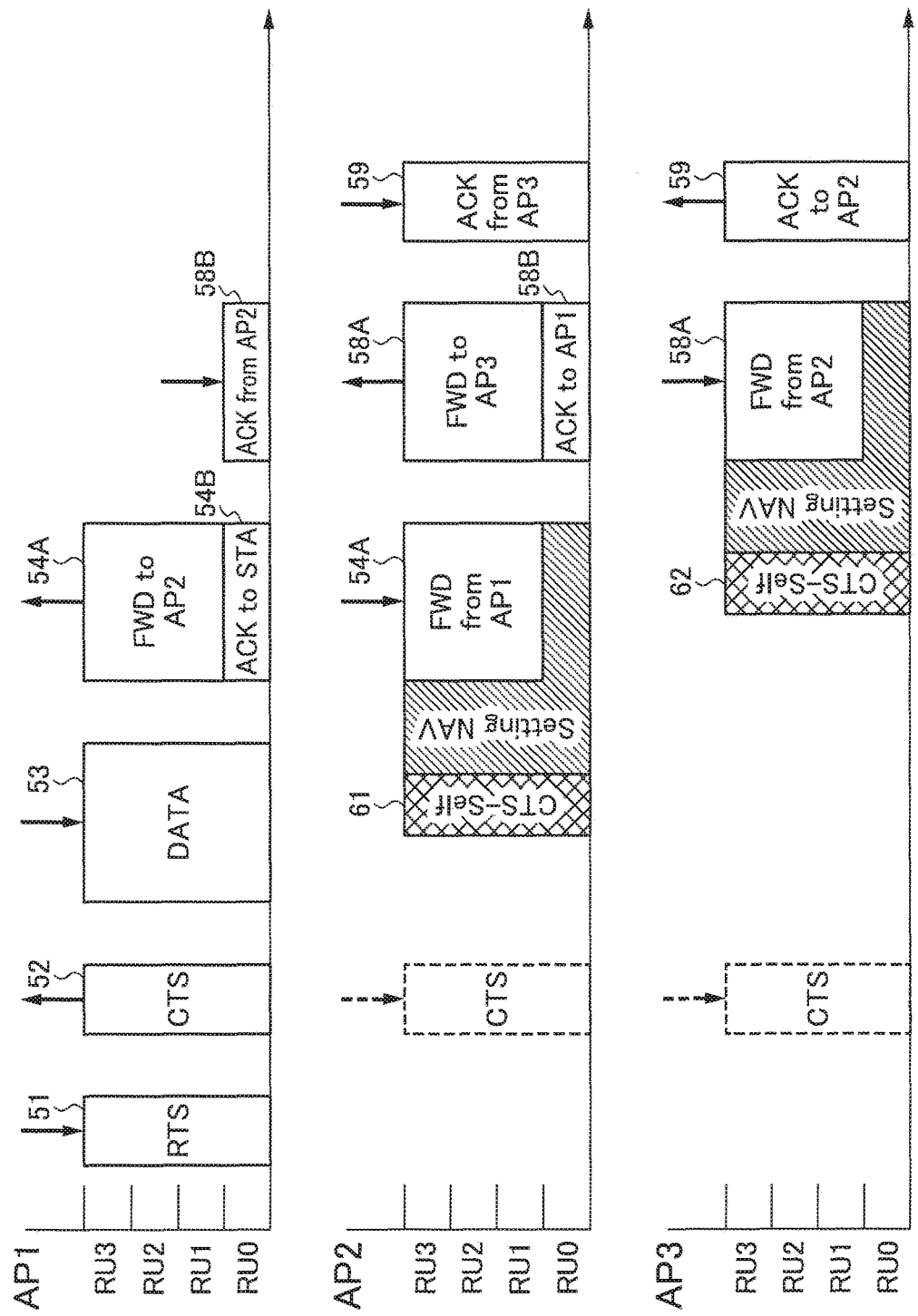
FIG. 11 is a diagram showing an exemplary sequence of a wireless communication system.

FIG. 11 is a diagram showing a second example of the sequence of the wireless communication system according to the embodiment. A description is given mainly of a difference from the sequence in the first example.

Once the access point 1 transmits the CTS frame 52 to a sender terminal of the RTS frame 51, this CTS frame 52 is received also by the access point 2 and the access point 3. The access points 2 and 3 each estimate a timing when they receive the frame for forwarding to themselves, based on the duration set in the Duration/ID field of the CTS frame 52, and set the NAV in the BSS of themselves to be before that timing. For this reason, the access points 2 and 3 transmit CTS-To-Self frames 61 and 62, respectively. The CTS-To-Self frame is a CTS frame in which the RA field is set to the MAC address (BSSID) of the access point of itself. A Duration/ID field of the CTS-To-Self frame is set to a value corresponding to the NAV desired to be set in the BSS of the access point of itself. For example, the access point 2 transmits the CTS-To-Self frame 61 in which the Duration/ID field is set to a duration such that the NAV is set until the completion of receiving the data frame 54A, the completion of forwarding the data frame 58A or the completion of receiving the ACK frame 59 to that for the terminal. In the figure, an example is shown in which the NAV is set until the completion of receiving the data frame 54A.

Similarly, the access point 3 transmits the CTS-To-Self frame 62 in which the Duration/ID field is set to a duration such that the NAV is set until the completion of receiving the data frame 58A or the completion of transmitting the ACK frame 59 to that. In the figure, an example is shown in which the NAV is set until the completion of receiving the data frame 58A.

If a device that transmitted the RTS frame 51 sets the NAV until the end of the ACK frame 54B, and the packet (including the data frame 54A and the ACK frame 54B) length or its maximum value can be grasped in advance in any way, the timing of the completion of receiving the frame forwarded to the access point of itself based on the Duration/ID of the CTS frame 52 can be estimated. The access points 2 and 3, by setting the NAV in the BSSs 2 and 3, can prevent the frame transmission from the terminals in the BSSs 2 and 3 when receiving the frames 54A and 58A forwarded to themselves, for example. In other words, the forwarded frames 54A and 58A can be prevented from failing to be received due to frame collision.

The access points 2 and 3 may orient the directivity of the antenna with respect to in the BSSs 2 and 3 when transmitting the CTS-To-Self frames 61 and 62 (see FIG. 2(A)). This can prevent the frame collision from occurring at the access point 1 when the access point 1 receives the data frame 53 from the terminal. In addition, the frame collision can be prevented from occurring at the access point 2 when the access point 2 receives the data frame 54A from the access point 1. The access points 2 and 3 return the directivity of the antenna to the omnidirectional directivity or set the directivity to a direction of the adjacent access point until when receiving the forwarded data frames 54A and 58A.

According to the above sequence, the access points 2 and 3 set the NAV in the BSSs 2 and 3 of themselves, for example, until the completion of receiving the data frames 54A and 58A. This restrains the frame transmission from the terminals in the BSSs 2 and 3 until the completion of receiving the data frames 54A and 58A. Therefore, the frames 54A and 58A for forwarding can be prevented from failing to be received due to frame collision. In other words, probability of normally receiving the frames 54A and 58A can be improved. By setting the NAV to be longer, probability of normally receiving the frames to be transmitted and received thereafter can also be improved.

Figure 12:
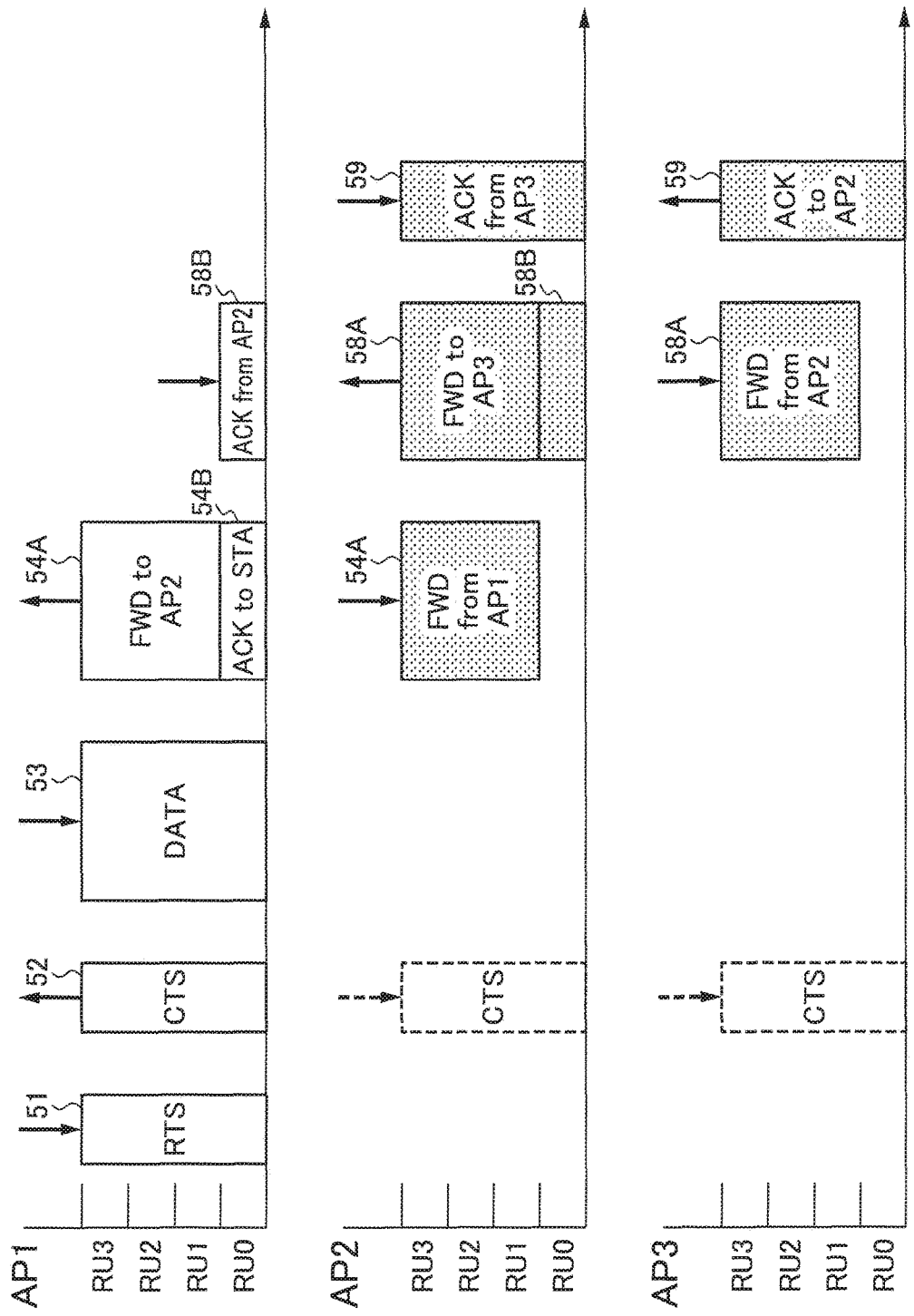
FIG. 12 is a diagram showing an exemplary sequence of a wireless communication system.

FIG. 12 is a diagram showing a third example of the sequence of the wireless communication system according to the embodiment. A description is given mainly of a difference from the sequences in the first and second examples.

The access point 2 orients the directivity of the antenna with respect to the adjacent access points 1 and 3 at the timing when receiving the data frame 54A forwarded from the access point 1 or before the timing. By doing so, when receiving the data frame 54A, the signal of this frame is not received by the access point 2 and only the data frame 54A can be correctly received even if a frame is transmitted from the terminal in the BSS 2. Also when transmitting the data frame 58A and the ACK frame 58B by way of the OFDMA after elapse of a certain time period from the completion of receiving the data frame 54A, the packet for the OFDMA is transmitted with that directivity being kept. After that, also when receiving the ACK frame 59, that directivity is kept. However, the directivity may be returned to the omnidirectional directivity at a timing when receiving the ACK frame 59.

The access point 3 also controls the directivity of the antenna similarly to the access point 2. The access point 3 orients the directivity of the antenna with respect to the adjacent access points 2 and 1 at the timing when receiving the data frame 58A forwarded from the access point 2 or before the timing. By doing so, when receiving the data frame 58A, the signal of this frame is not received by the access point 3 and only the data frame 58A can be correctly received even if a frame is transmitted from the terminal in the BSS 3. Also when transmitting the ACK frame 59 after elapse of a certain time period from the completion of receiving the data frame 58A, that directivity is kept. However, the antenna may be returned to be the omnidirectional directivity at a timing when transmitting the ACK frame 59.

According to the above sequence, the access points 2 and 3 orient the directivity of the antenna of themselves with respect to the adjacent access point before receiving the forwarded frames 54A and 58A. By doing so, when receiving the forwarded frames 54A and 58A, the frames 54A and 58A can be correctly received even if frames are transmitted from the terminals in the BSSs 2 and 3. In other words, the frames 54A and 58A for forwarding can be prevented from failing to be received due to the frame collision.

Figure 13:
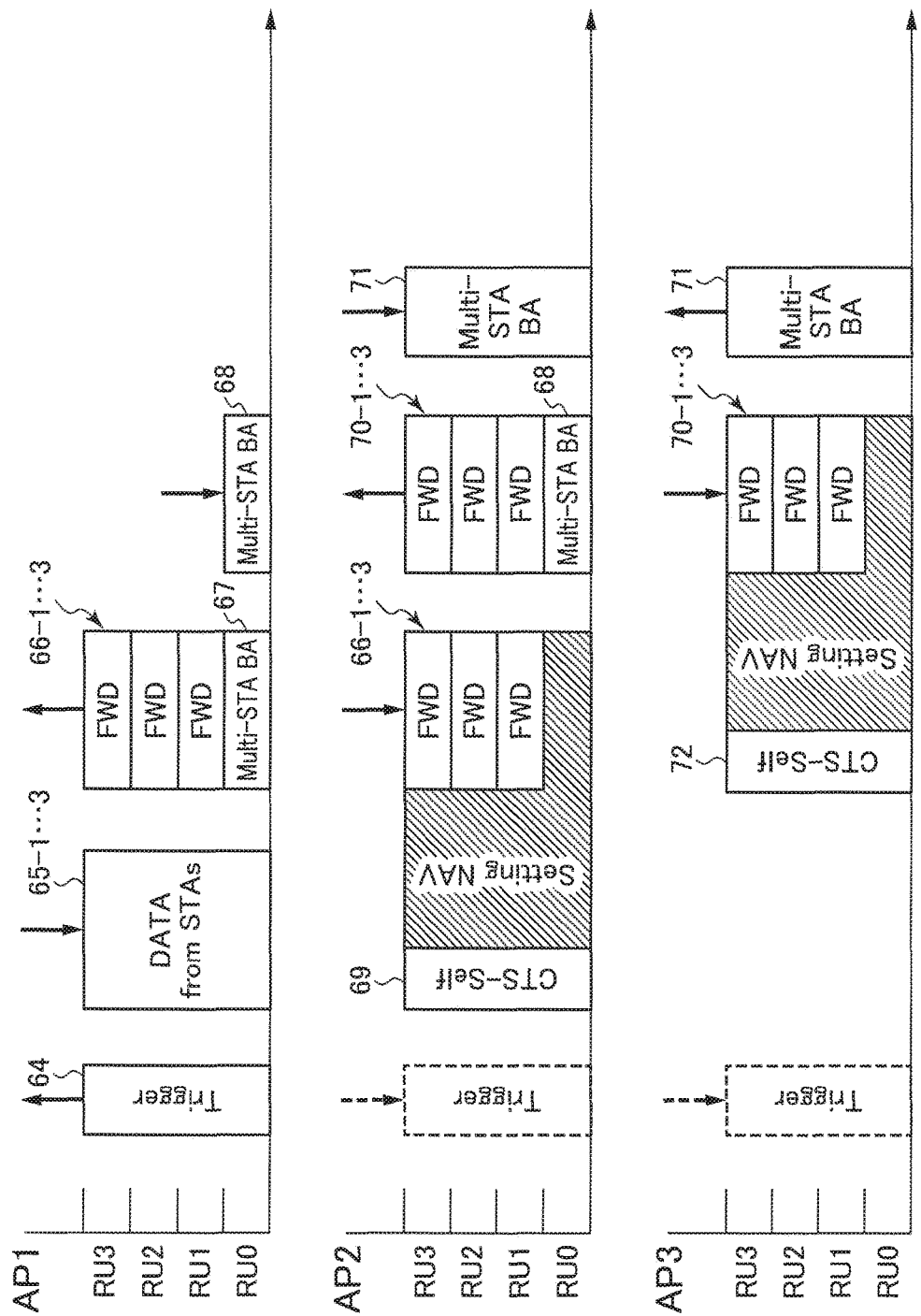
FIG. 13 is a diagram showing an exemplary sequence of a wireless communication system.

FIG. 13 is a diagram showing a fourth example of the sequence of the wireless communication system according to the embodiment. A description is given mainly of a difference from the sequences in the first to third examples.

In the sequences in the first to third examples, the access point 1 receives the data frame from one terminal in the BBS 1, but this sequence shows a case where a plurality of frames are received by way of multiuser-transmission from a plurality of terminals in the BSS 1. Any multiuser-transmission scheme may be used. For example, uplink OFDMA (UL-OFDMA) may be used, UL-MU-MIMO (Up-Link Multi-User Multi-Input and Multi-Output) may be used, or a combination of the UL-OFDMA and the UL-MU-MIMO (UL-OFDMA & UL-MU-MIMO) may be used.

In the UL-MU-MIMO, a plurality of terminals 1 to 4 simultaneously transmit the frames at the same frequency band. The physical headers of the frames transmitted by a plurality of terminals are set to signals orthogonal to each other (space separation signal). The access point can divide the plural frames to receive on the basis of these space separation signals. This achieves the UL-MU-MIMO. These space separation signals correspond to the resources used by the terminals by way of the UL-MU-MIMO.

The access point 1 selects a plurality of terminals specified as those to perform the multiuser-transmission from within the BSS 1, and generates a trigger frame 64 in which the selected plural terminals are specified. The access point 1 acquires the access right to the wireless medium in accordance with the procedure described above, and transmits the trigger frame 64. The trigger frame 64 may be received by the access points 2 and 3 (see trigger frames surrounded by a broken line in the figure).

FIG. 14 shows an exemplary format of the trigger frame. The format in FIG. 14 has a format of a general MAC frame as a base shown in FIG. 3 and includes a Frame Control field, a Duration/ID field, an Address 1 field, an Address 2 field, a Common Info field (Common Info) field, plural terminal information (Per User Info) fields, and a FCS field. A Type and Subtype of the Frame Control field are used to specify that a frame is the trigger frame. The Type is "control" as an example, and the Subtype may define a new value corresponding to the trigger frame. However, the trigger frame may be defined with the Type being "management" or "data". Note that, instead of defining a new value as the Subtype, a field notifying that a frame is the trigger frame may be represented using a reserved field of the MAC header.

The RA is a broadcast address or a multicast address. The TA is a MAC address (BSSID) of the access point. However, the RA or the TA or both of them may be omitted in some cases.

The Common Info field is set to parameter information notified to the plural terminals in common. For example, it includes a transmission time for transmitting the frame by the terminal (e.g., a time in μsec units or a time in 16 μs units is set), or information capable of calculating the transmission time (e.g., the number of bytes). More specifically, the packet (physical layer convergence procedure (PLCP) protocol data unit; PPDU) length, more concretely, an L-SIG Length value contained in a Legacy Preamble part of the PPDU is set. This allows the ends of the frames (packets) transmitted by the terminals to be aligned with each other. The Common Info field also includes information for identifying the space separation signals to be used by the terminals. It may include information indicating a frequency bandwidth (e.g., indicating a 20 MHz width, or an 80 MHz width) or length information on a Guard Interval for the PHY payload. It may also include information indicating an operation to request from the terminal in a case of receiving the trigger frame. For example, a request may be set which is to report information specifying the kind of the frame or data to transmit or a volume of data in a state of waiting transmission (data size) accumulated on the terminal. Additionally, for example, information specifying a format of a terminal information field, information on the number of the Per User Info fields, or the like may be set.

The Per User Info field is set to parameter information uniquely notified to the terminal. For example, the AID allocated to the terminal is set. Information specifying the space separation signal used by the terminal is also included. A parameter is also included which is used in a PHY layer unique to the terminal in a case of transmission by the terminal. For example, included are PHY transmission speed information such as the number of streams (Nsts: number of space time streams) and an MCS (Modulation and Coding Scheme) Index indicating a transmission rate at which the terminal transmits the data, the kind of error-correcting codes to be applied (LDPC (Low Density Parity Check) or the like), transmit power information, and the like. The access point may specify the transmit power for the terminal in order to equally control signal power from the terminals in a case of receiving the signals from the plural terminals.

The terminals in the BSS 1 which receive the trigger frame 64 and are specified in the trigger frame 64 transmit the data frames after elapse of a certain time period from the completion of receiving the trigger frame 64. The data frames all are transmitted at one channel bandwidth, but the physical headers of the data frames are set to the signals orthogonal to each other, allowing the access point 1 on the reception side to correctly divide these pieces of data. The example in the figure shows a case where three terminals 1 to 3 transmit data frames 65_1, 65_2, and 65_3. In this case, the terminals 1 to 3 perform the multiuser-transmission of the data frames 65_1, 65_2, and 65_3.

Once the access point 1 receives the data frames 65_1 to 65_3, it generates data frames 66_1, 66_2, and 66_3 for forwarding the data frames 65_1 to 65_3, and an acknowledgement response frame 67 including the acknowledgement information with respect to all of the data frames 65_1 to 65_3. The access point 1 transmits the data frame 66_1 to 66_3 and the acknowledgement response frame 67 by way of the OFDMA after elapse of a certain time period from the completion of receiving the data frames 65_1 to 65_3. As an example of the acknowledgement response frame 67, a Multi-Station BA (hereinafter, referred to as Multi-STA BA) frame may be used, or a newly defined frame may be used. In the figure, a case of the Multi-STA BA frame is shown. An RA of the Multi-STA BA frame is a broadcast address or a multicast address. An RA of each of the data frames 66_1, 66_2 and 66_3 is the MAC address (BSSID) of the access point 2.

Figure 15:
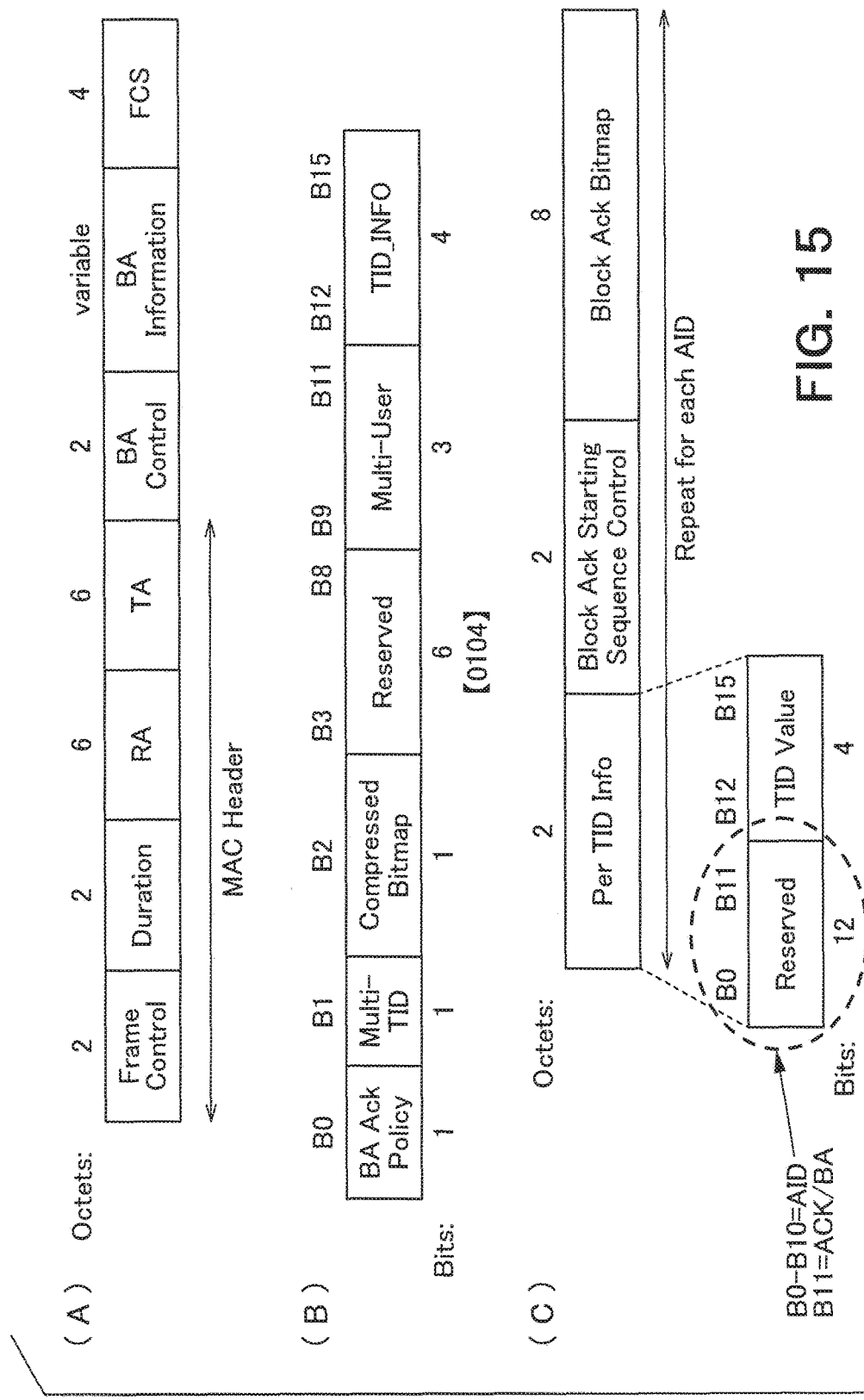
FIG. 15 is an illustration of a Multi-STA BA frame.

A description is given of the Multi-STA BA frame here. The Multi-STA BA frame is obtained by diverting the Block Ack frame (BA frame) thereto in order to make the acknowledgement using one frame with respect to the plural terminals. A frame type may be "Control" similarly to the normal BA frame, and a frame subtype may be "BlockAck". FIG. 15(A) to 15(C) each show an exemplary format of the Multi-STA BA frame. FIG. 15(B) shows an exemplary format of a BA Control field of the BA frame, and FIG. 15(C) shows an exemplary format of a BA Information field of the BA frame. In a case of reusing the BA frame, an indication may be made in the BA Control field that the BA frame format is that extended for notifying the acknowledgement response regarding the plural terminals. For example, in the IEEE802.11 standard, a case where a Multi-TID subfield is 1 and a Compressed Bitmap subfield is 0 is reserved. This may be used in order to indicate that the BA frame format is that extended for notifying the acknowledgement response regarding the plural terminals. Alternatively, an area of bits B3-B8 is a reserved subfield in FIG. 15(B), but all or a part of this area may be defined in order to indicate that the BA frame format is that extended for notifying the acknowledgement response regarding the plural terminals. Alternatively, the notification like this may not be necessarily made explicitly.

The RA field of the BA frame may be set to a broadcast address or a multicast address as an example. A Multi-User subfield in the BA Control field may be set to the number of the users (number of the terminals) to be reported by means of the BA Information field. In the BA Information field, there are arranged for each user (terminal), a subfield for the Association ID, a Block Ack Starting Sequence Control subfield, and a Block Ack Bitmap subfield.

The Association ID subfield is set to the AID for identifying the user. More specifically, as an example, a part of a Per TID Info field is used as the subfield for the Association ID as shown in FIG. 15(C). Currently, 12 bits (from B0 to B11) are a reserved area. The first 11 bits (B0-B10) of these are used as the subfield for the Association ID. The Block Ack Starting Sequence Control subfield and the Block Ack Bitmap subfield may be omitted if the frame transmitted by the terminal is a single data frame (that is, if not the aggregation frame). If the frame transmitted by the terminal is the aggregation frame, the Block Ack Starting Sequence Control subfield has stored therein a sequence number of the first MSDU (medium access control (MAC) service data unit) in the acknowledgement response shown by the relevant Block Ack frame. The Block Ack Bitmap subfield may be set to a bitmap (Block Ack Bitmap) constituted by bits of reception success or failure for the sequence numbers subsequent to the Block Ack Starting Sequence number.

The terminal receiving the Multi-STA BA frame confirms the Type and Subtype of the Frame Control field. If the terminal detects that these are "Control" and "BlockAck", then the terminal confirms the RA field and, on the basis of that the value of the RA field is the broadcast address or the like, identifies from the Block Ack Bitmap field the information on the acknowledgement response (success or failure) with respect to each data frame in the frames transmitted by itself (in the case of the aggregation frame) to determine transmission success or failure of the data frame. For example, the terminal identifies the TID Info subfield storing its AID from within the BA Information field, identifies the value (starting sequence number) set in the Block Ack Starting Sequence Control subfield subsequent to the identified TID Info subfield, and identifies from the Block Ack Bitmap the transmission success or failure of the sequence numbers subsequent to the starting sequence number. A bit length of the AID may be shorter than a length of the TID Info subfield, and the AID may be stored in a part of the area of the TID Info subfield (e.g., the first 11 bits (B0-B10) of 2 octets (16 bits)), for example.

In a case where the terminal transmits not the aggregation frame but a single frame by way of the UL-OFDMA, the following may be made, for example. As shown in FIG. 15(C), one bit in the TID Info subfield of each BA Information field (e.g., the 12th bit (B11, if the first bit is B0) from the head of 2 octets (16 bits)) is used as a bit indicating "ACK" or "BA" (ACK/BA bit) and the relevant bit is set to a value indicating "ACK". If the value indicating "ACK" is set, the Block Ack Starting Sequence Control subfield and the Block Ack Bitmap subfield are omitted. This allows notification of "ACK" for the plural terminals by means of one BA frame. The terminal of which the check result is a failure is not necessary to be notified of the ACK, and thus, the notification regarding the relevant terminal may not be made by means of the Multi-STA BA frame. The terminal on the receiving side cannot detect the field containing the AID for itself (because of no ACK notified) and can determine that it has failed in the transmission. In this way, even if the plural terminals transmit any of the aggregation frame and the single frame, the acknowledgement can be made with respect to the plural terminals by means of the single acknowledgement response frame obtained by diverting the BA frame thereto.

Once the access point 2 receives the trigger frame 64 transmitted by the access point 1, it transmits a CTS-To-Self frame 69 to set the NAV in the BSS 2. The access point 2 waits for forwarding from the access point 1 in this state. Once the access point 2 receives the data frames 66_1 to 66_3, it generates an acknowledgement response frame (Multi-Station BA frame) 68 including the acknowledgement information with respect to all of the data frames 66_1 to 66_3, and generates data frames 70_1, 70_2, and 70_3 for forwarding the data frames 66_1 to 66_3. The access point 2 transmits the data frames 70_1, 70_2, and 70_3 and the Multi-STA BA frame 68 by way of the OFDMA after elapse of a certain time period from the completion of receiving the data frames 66_1 to 66_3.

Once the access point 3 receives the trigger frame 64 transmitted by the access point 1, it transmits a CTS-To-Self frame 72 to set the NAV in the BSS 3. The access point 3 waits for forwarding from the access point 2 in this state. Once the access point 3 receives the data frames 70_1 to 70_3, it generates an acknowledgement response frame (Multi-STA BA frame) 71 including the acknowledgement information with respect to all of the data frames 70_1 to 70_3. The access point 3 transmits the Multi-STA BA frame 71 after elapse of a certain time period from the completion of receiving the data frames 70_1 to 70_3.

In the sequence shown in FIG. 13, a step may be added of identifying the terminal having a request of the multiuser-transmission before transmitting the trigger frame 64. The terminal specified in the trigger frame 64 may be identified from among the terminals identified in the relevant step.

According to the above sequence, the access point 1 performs by way of the OFDMA at a time forwarding the frames multiplex-transmitted from a plurality of terminals to the access point 2 and transmitting the acknowledgement information to the relevant plurality of terminals. Therefore, the frame can be efficiently forwarded. The access point 2 also performs similarly performs by way of the OFDMA at a time forwarding the plural frames received from the access point 1 to the access point 3 and transmitting the acknowledgement information for the relevant plural frames to the access point 1. Therefore, the frame forwarding and the acknowledgement can be efficiently carried out.

Figure 16:
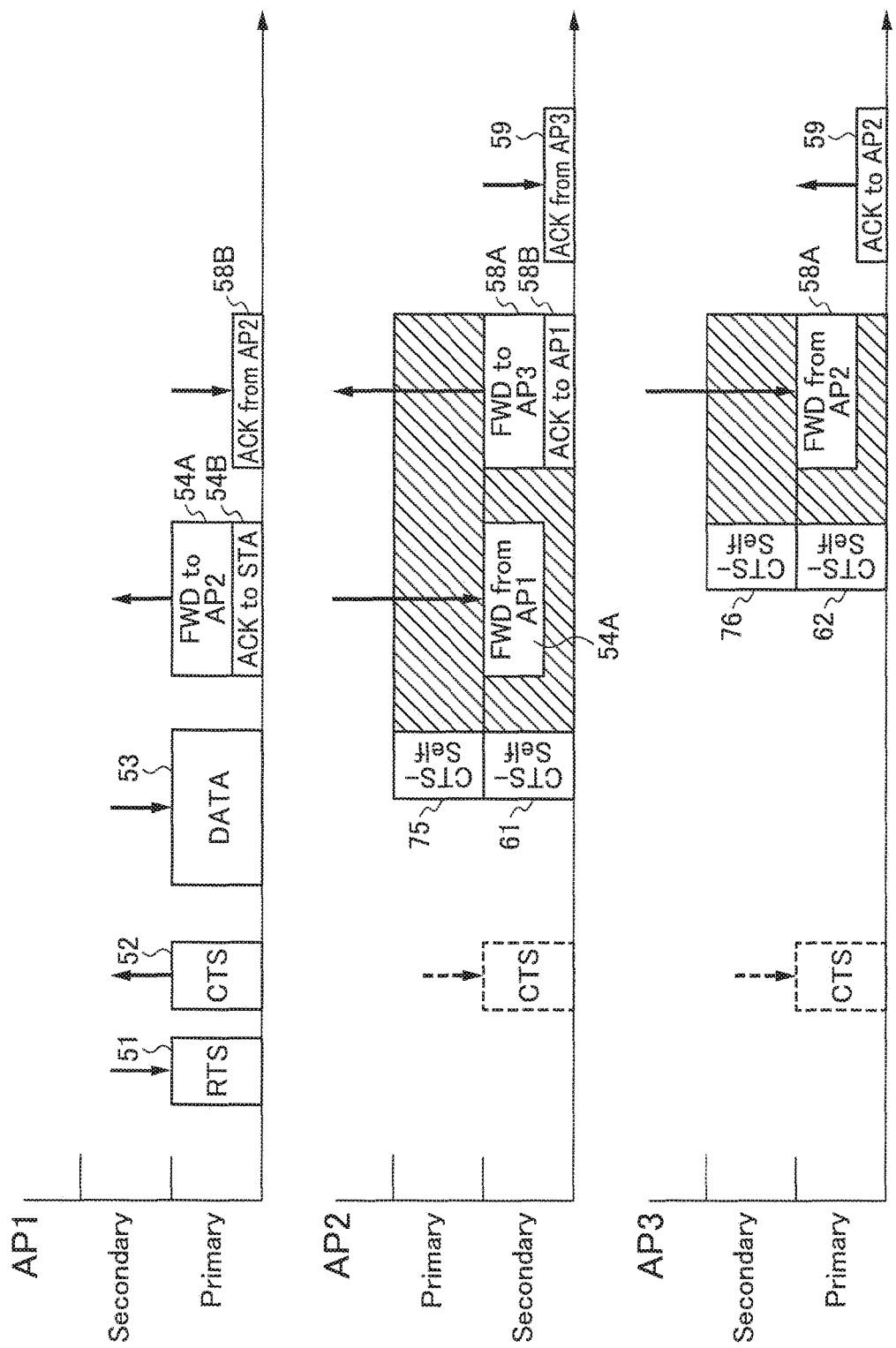
FIG. 16 is a diagram showing an exemplary sequence of a wireless communication system.

FIG. 16 is a diagram showing a fifth example of the sequence of the wireless communication system according to the embodiment. A description is given mainly of a difference from the sequences in the first to fourth examples.

In the sequences in the first to fourth examples, the case of using one channel of 20 MHz bandwidth is shown, but the fifth sequence shows an example of a case where two channels each of 20 MHz bandwidth (here, referred as a channel 1 and a channel 2) are used. In each of the access points 1 to 3, one channel is set to a Primary and the other channel is set to a Secondary. In the embodiment, the access point 1 sets the channel 1 to the Primary and the channel 2 to the Secondary. The access point 2 sets the channel 1 to the Secondary and the channel 2 to the Primary. The access point 3 sets the channel 1 to the Primary and the channel 2 to the Secondary. In other words, the settings are differentiated between the access points adjacent to each other. This can reduce a chance of signal collision between the BSSs adjacent to each other. The access points can perform communication using only the Primary and communication using simultaneously both of the Secondary and the Primary by means of band spreading.

An operation of the access point 1 is the same as in the sequence in the first to third examples. The access point 1 operates using only the Primary channel (channel 1). Therefore, the CTS frame 52, data frame 53 and the like transmitted from the access point 1 are received by the access point 2 using the Secondary channel (channel 1).

An operation of the access point 2 is basically the same as in the sequence in the second example (see FIG. 11). A difference is not only that the CTS-To-Self frame 61 is transmitted using the Secondary channel as the channel 1 which is used by the AP 1 but also that a CTS-To-Self frame 75 is transmitted using the Primary channel (channel 2). This allows the NAV to be set not only in the Secondary channel but also in the Primary channel. This can prevent that the frame is transmitted from the terminal in the BSS 2 using the channel 2 (Primary channel) to cause the frame collision in receiving the data frame 54A using the channel 1.

An operation of the access point 3 is also basically the same as in the sequence in the second example (see FIG. 11). A difference is not only that the CTS-To-Self frame 62 is transmitted using the Primary channel as the channel 1 but also that a CTS-To-Self frame 76 is transmitted using the Secondary channel (channel 2). This allows the NAV to be set not only in the Primary channel but also in the Secondary channel. This can prevent that the frame is transmitted from the terminal in the BSS 3 using not only the channel 1 but also the channel 2 and prevent the frame collision in receiving the data frame 58A.

In the example in FIG. 16, the bandwidths for the access points are the same of 40 MHz, but are not necessarily the same. For example, the bandwidth for one of these access points may be 80 MHz. The access point capable of handling the wider band may be located closer to the wired network side.

Figure 17:
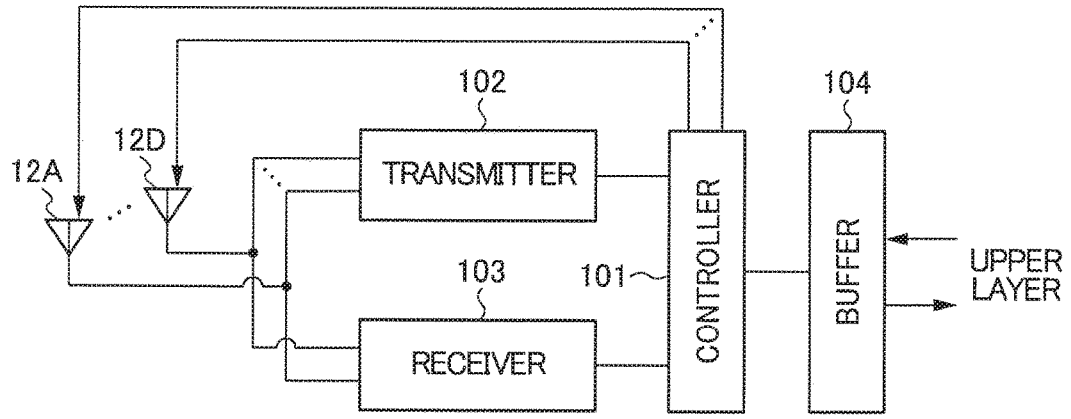
FIG. 17 is a functional block diagram of a wireless communication device equipped in an access point.

FIG. 17 is a functional block diagram of the wireless communication device in the access point. The wireless communication device in the access point includes antennas 12A, 12B, 12C and 12D, a controller 101, a transmitter 102, a receiver 103, and a buffer 104. The number of the antennas is four although the number may be one or more.

Directivities of antennas 12A to 12D are settable. The directivity setting is performed by a controller 101. The respective antennas may have directivities different from each other to control the directivity by switching the antennas to use, or the directivity may be controlled by means of synthesis of entire the antennas 12A to 12D. As an example, the omnidirectional directivity, the directivity in FIG. 2(A), and the directivity in FIG. 2(B) can be switched over to each other.

The controller 101 corresponds to controlling circuitry or a baseband integrated circuitry which controls communication with the terminals, and the transmitter 102 and the receiver 103 form a wireless communicator or an RF integrated circuitry which transmits and receives frames via the antenna as an example. A process of the controller 101, and all or a part of a digital region process of the transmitter 102 and the receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and the receiver 103.

The buffer 104 is a storage for transferring a frame such as the data frame between an upper layer and the controller 101. The buffer 104 may be a volatile memory such as a DRAM or a non-volatile memory such as a NAND, or an MRAM.

The upper layer stores the frame received from another network in the buffer 104 for relaying to the network in the terminal side, or takes in, from the controller 101, the frame received from the network or a payload thereof via the buffer. The upper layer may perform an upper communication process than a MAC layer such as a TCP/IP or a UDP/IP. Alternatively, the TCP/IP or a UDP/IP may be performed in the controller 101 and the upper layer may also perform a process of an application layer of processing the data upper that the TCP/IP or the UDP/IP. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer (e.g., a process concerning the OFDMA or MU-MIMO or the like). The controller 101 transmits and receives the frame via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the terminal, performs an association process to exchange required information on capability or an attribute etc. each other and establishes the wireless link with the terminal. The controller 101 may perform a process such as an authentication process if necessary before receiving the association request. The controller 101 may acquire information concerning, as capability information of the terminal, whether to be compliant with the OFDMA, whether to be compliant with the UL-MU-MIMO, and the like. The capability information may be acquired as a response to transmission of a request to transmit the capability information when not at the association process but at any timing after that.

The controller 101 periodically checks the buffer 104 to confirm the state of the buffer 104 such as existence or non-existence of data for downlink transmission. Alternatively, the controller 101 may check the buffer 104 according to a trigger given from an external device as such the buffer 104.

The controller 101, when transmitting the frame (more specifically, the physical packet having the physical header added to the frame), as an example, performs the carrier sensing in accordance with the CSMA/CA before the transmission, and if a carrier sensing result shows being idle (if a value of the CCA is equal to or less than a threshold), the access right to the wireless medium is acquired. The controller 101 subjects the frame to processes such as encode and a modulation process based on the MCS to output to a transmitter 102. The transmitter 102 subjects the input frame (more specifically, the physical packet having the physical header added thereto) to DA conversion, a filtering process to extract components of a desired band, frequency conversion (up-conversion) and the like to amplify signals obtained through these processes by a pre-amplifier and radiate the amplified signals as radio waves from the plural antennas into the space.

The signal received by each antenna in the access point is processed in the receiver 103 for each reception system corresponding to the each antenna. The received signal of each antenna is amplified by a low noise amplifier (LNA) in the corresponding reception system, is subjected to frequency conversion (down-convert), and is subjected to a filtering process, thereby allowing a desired band component to be extracted. Each extracted signal is further converted into a digital signal through AD conversion and a resultant packet is input to the controller 101. The digital signals in the reception systems are synthesized by a diversity technique to acquire the packets. The synthesis may be performed in a state of analog signals before converted to the digital signals. In the case of the OFDMA, a component is extracted for each resource unit to extract a packet. In the case of the MU-MIMO, the space separation signals are used to separate the signals into a plurality of packets.

The controller 101 subjects the received packet to processes such as demodulation and error-correcting decode to acquire the frame to carry out CRC check of the frame (in a case of the aggregation frame, the CRC check is carried out for the plural data frames in the aggregation frame). The controller 101 transmits the acknowledgement response frame (more specifically, the packet having the physical header added thereto) after elapse of a predefined time period from the completion of receiving the frame from the terminal. In a case where the frame is the aggregation frame, the acknowledgement response frame is the BA frame. The transmitter 102 subjects the acknowledgement response frame to DA conversion, a filtering process to extract components of a desired band, frequency conversion (up-conversion) and the like to amplify signals obtained through these processes by a pre-amplifier and radiate the amplified signals as radio waves from the plural antennas into the space.

The controller 101 may access a storage for storing the information to be transmitted via the frame to the terminal or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and the transmitter 102 is an example, and another form may be used. For example, the controller 101 may perform the process until the digital region process and the DA conversion, and the transmitter 102 may perform process subsequent to the DA conversion. As for the isolation of the processes of the controller 101 and the receiver 103, similarly, the receiver 103 may perform the process before the AD conversion and the controller 101 may perform the digital region process including processes following the AD conversion. Isolation other than those described above may be used.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit.

The processing processes between blocks or processing processes between the baseband integrated circuit and the RF integrated circuit may be demarcated from each other in accordance with any method other than those described herein.

Figure 18:
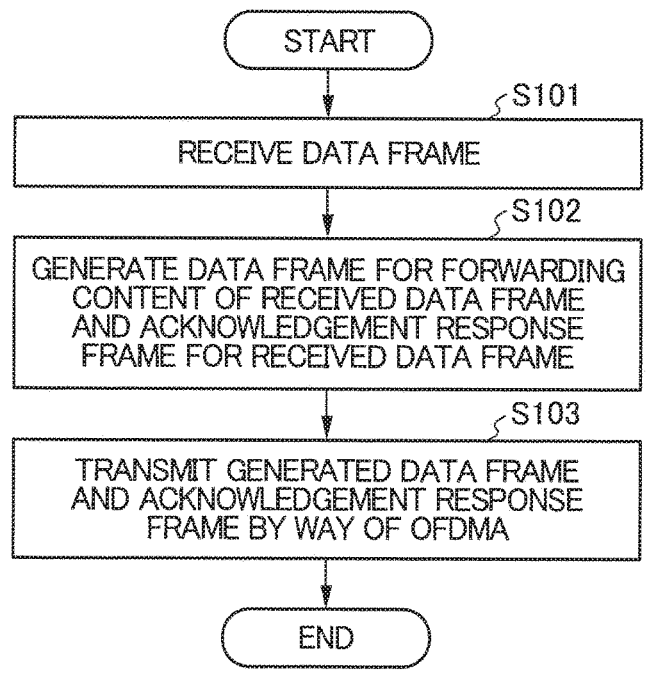
FIG. 18 is a flowchart of an exemplary operation of an access point.

FIG. 18 is a flowchart of a first exemplary operation of a controller 101 in the access point. If the controller 101 receives the data frame from the terminal in the BSS of itself or the adjacent access point (S101), it generates the acknowledgement response frame with respect to the relevant data frame, and the data frame for forwarding content of the relevant data frame (that is, data of the frame body field of the data frame) (S102). The generated data frame and the acknowledgement response frame are transmitted by way of the OFDMA (S103). The RA of the generated data frame is the MAC address (BSSID) of the access point as a relay destination.

In the above flow, the acknowledgement response frame (ACK frame) is transmitted in response to the data frame, but another frame may be transmitted. For example, if the terminal or the access point transmits the frame not requesting for ACK, another kind of frame such as the data frame may be transmitted to the relevant terminal or access point. A frame whose RA is a broadcast address (such as a management frame) may be transmitted. Alternatively, the frame directed to other terminal or access point than the relevant terminal or access point (i.e., different from the relay destination access point) may be transmitted. The description here is applicable to the following other flowcharts.

Figure 19:
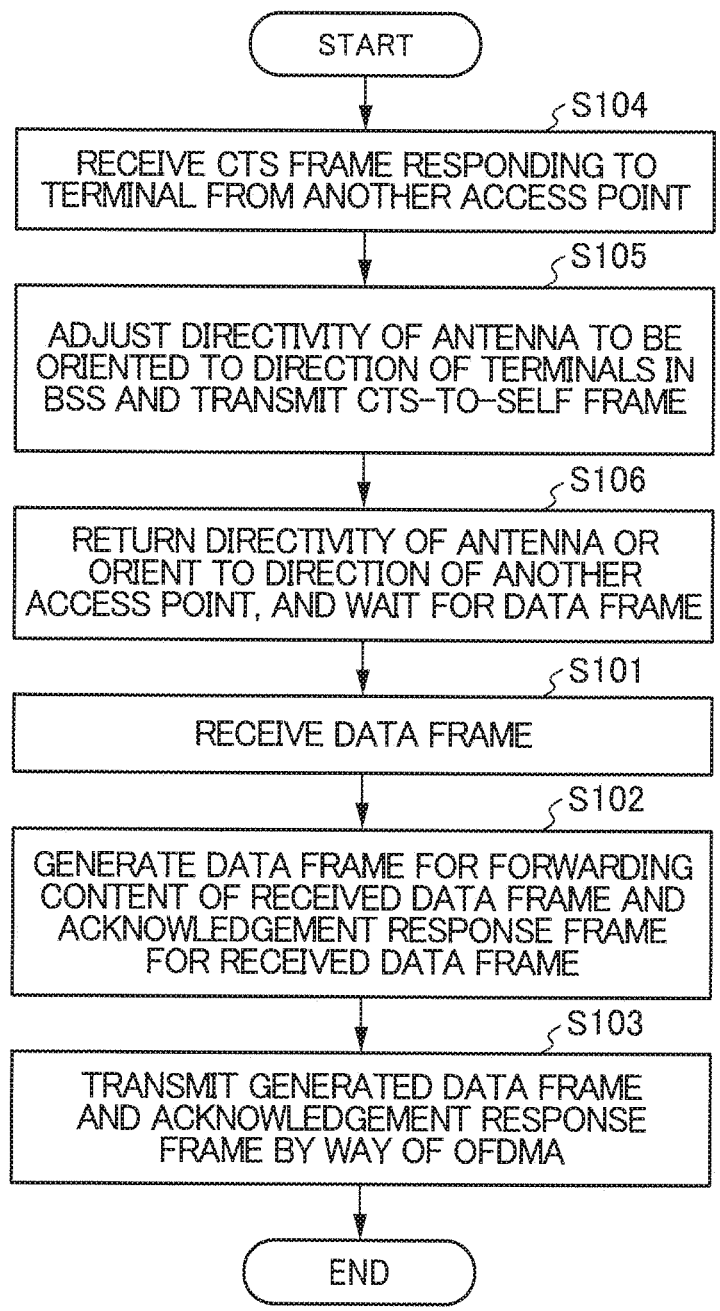
FIG. 19 is a flowchart of an exemplary operation of an access point.

FIG. 19 is a flowchart of a second exemplary operation of the controller 101 in the access point. If the controller 101 receives the CTS frame which is transmitted to the terminal from another access point (the access point downstream of itself, that is, the access point with the number of hops until the wired network being larger than itself) (S104), it adjusts the directivity of the antenna to be oriented to a direction of the terminals in its BSS (S105). The CTS-To-Self frame is transmitted after elapse of a certain time period from receiving the CTS frame (also at S105). This allows the NAV to be set in the BSS of the access point of itself. The controller 101 may estimate a reception timing of the data frame forwarded to itself based on the Duration/ID field of the CTS frame to allow the NAV to be set to be before that timing. This allows the NAV to be set to be later so as to improve communication efficiency in the BSS of the access point of itself for a time period before that set. Once the CTS-To-Self frame is transmitted, the directivity of the antenna is returned to the omnidirectional directivity or the directivity is oriented to the direction of the adjacent access point (S106). The reception of the data frame is waited for, which is forwarded from the adjacent access point, and the operations after receiving the data frame are the same as at S101 to S103 in FIG. 14.

Figure 20:
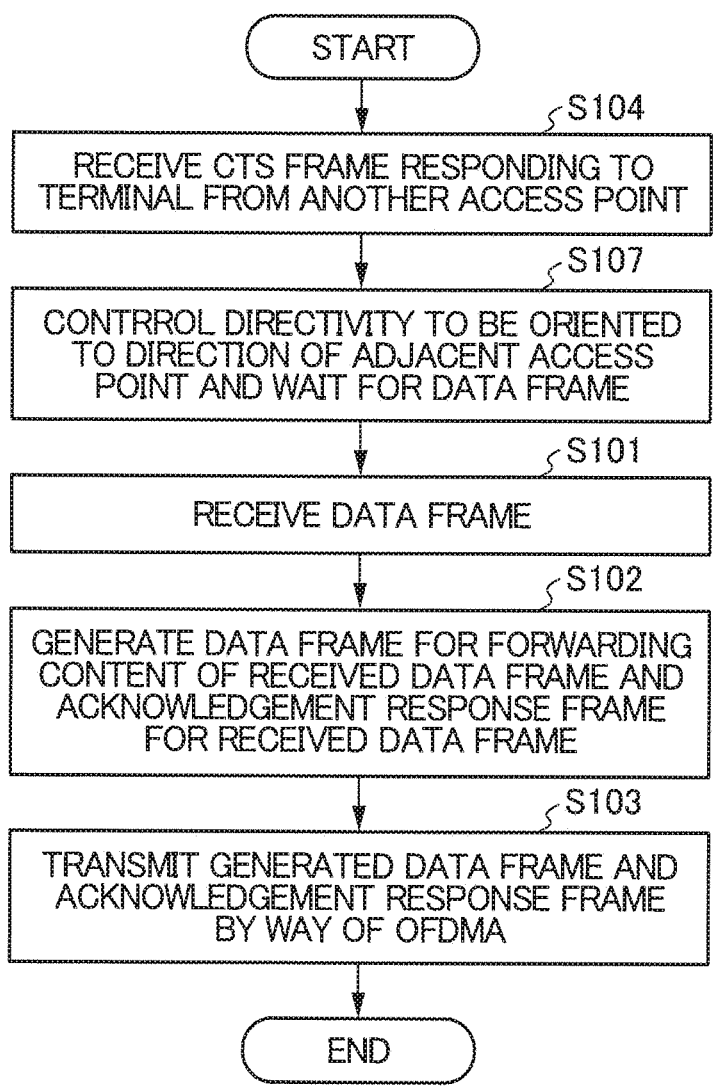
FIG. 20 is a flowchart of an exemplary operation of an access point.

FIG. 20 is a flowchart of a third exemplary operation of the controller 101 in the access point. If the controller 101 receives the CTS frame which is transmitted to the terminal from another access point (the access point downstream of itself, that is, the access point with the number of hops until the wired network being larger than itself) (S104), it adjusts the directivity of the antenna to be oriented to a direction of the relevant another terminal (S107). In that state, the data frame is waited for (also at S107), and the operations after receiving the data frame are the same as at S101 to S103 in FIG. 14.

Figure 21:
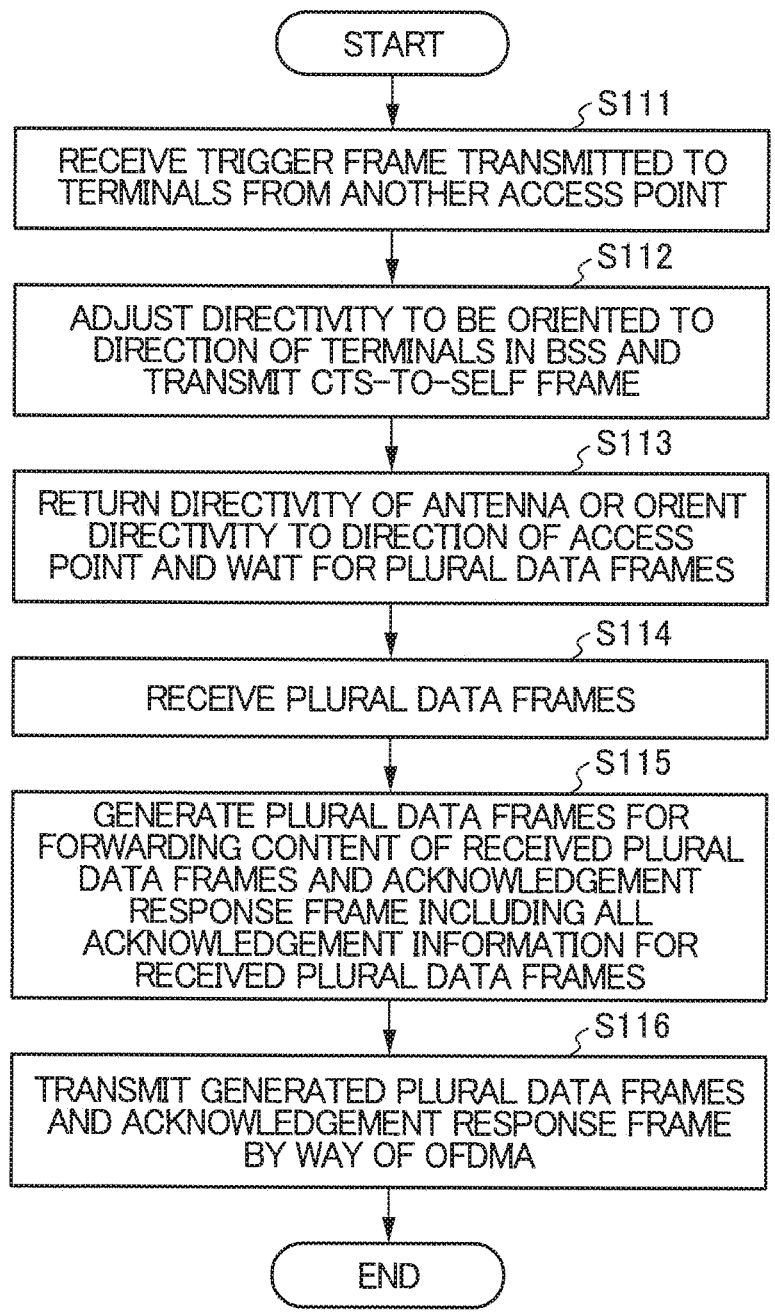
FIG. 21 is a flowchart of an exemplary operation of an access point.

FIG. 21 is a flowchart of a fourth exemplary operation of the controller 101 in the access point. If the controller 101 receives the trigger frame which is transmitted to the terminals from another access point (the access point downstream of itself, that is, the access point with the number of hops until the wired network being larger than itself) (S111), it adjusts the directivity of the antenna to be oriented to a direction of the terminals in its BSS (S112). Then, the CTS-To-Self frame is transmitted after elapse of a certain time period from receiving the trigger frame (also at S112). This allows the NAV to be set in the BSS of the access point of itself. The controller 101 may estimate a reception timing of the data frame forwarded to itself based on the information in the trigger frame to allow the NAV to be set to be before that timing. This allows the NAV to be set to be later and a time period before that to be used for communication in the BSS of the access point of itself so as to improve communication efficiency. Once the CTS-To-Self frame is transmitted, the directivity of the antenna is returned to the omnidirectional directivity or the directivity is oriented to the direction of the adjacent access point (S113). The reception of the plural data frames is waited for, which are forwarded from the adjacent access point by way of OFDMA. Once the controller 101 receives the plural data frames from the adjacent access point (S114), it generates one acknowledgement response frame (Multi-STA BA frame or the like) with respect to the relevant plural data frames, and plural data frames for forwarding the content of the relevant plural data frames (that is, data of the frame body field of the data frame) (S115). The generated plural data frames and the acknowledgement response frame are transmitted by way of the OFDMA (S116).

Figure 22:
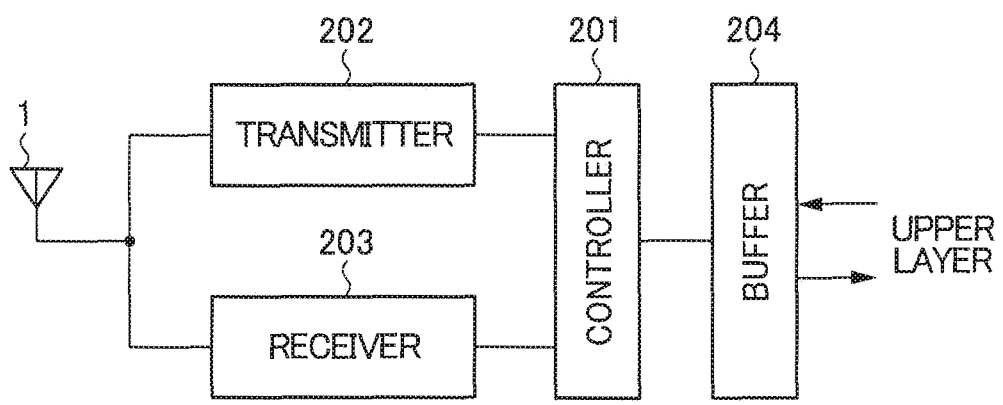
FIG. 22 is a functional block diagram of a wireless communication device equipped in a wireless terminal.

FIG. 22 is a functional block diagram of the wireless communication device installed in the terminal.

The wireless communication device includes a controller 201, a transmitter 202, a receiver 203, at least one antenna 1, and a buffer 204. The controller 201 corresponds to controlling circuitry or a baseband integrated circuit which controls communication with the access point, and the transmitter 202 and the receiver 203 form a wireless communicator or an RF integrated circuit which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 103.

The buffer 204 is a storage for transferring a frame or data between an upper layer and the controller 201. The buffer 204 may be a volatile memory such as a DRAM or a non-volatile memory such as a NAND, or an MRAM.

The upper layer generates the frames or data to be transmitted to other terminals, the access point, or a device on another network such as a server and stores the generated frames in the buffer 204, or takes in, via the buffer 204, the frames received from other terminals, the access point, or a device on another network such as a server. The upper layer may perform an upper communication process than a MAC layer such as a TCP/IP or a UDP/IP. The TCP/IP or the UDP/IP may be performed in the controller 201 and the upper layer may perform a process of an application layer of processing the data upper than the TCP/IP or the UDP/IP. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point to control the communication with the access point. The controller 201 receives via the antenna 1 and the receiver 203 a beacon frame periodically transmitted from the access point 11, for example. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, receives the beacon frame to detect the attribute and synchronization information of BSS of the access point 11 and then transmits an association request to the access point 11 to perform an association process in response to the received beacon. Thereby, the control 201 exchanges required information on capability or an attribute etc. each other (which may include capability information of whether the terminal or the access point has capability to carry out OFDMA) and establishes the wireless link with the access point 11. The controller 201 may perform a process such as an authentication process if necessary before transmitting the association request. The controller 201 may transmit the number of antennas included in the terminal of itself as the capability information of the terminal. The capability information may be transmitted, in addition to at the association process, when receiving the acquisition request for the capability information from the access point.

The controller 201 periodically checks the buffer 204 to grasp a state of the buffer 204 such as whether or not the data exists to be transmitted by way of the uplink transmission. Alternatively, the controller 201 checks the state of the buffer 204 by an external trigger such as the buffer 204. Once the controller 201 confirms the existence of the data in the buffer 204, it may transmit, after acquiring the access right to the wireless medium (transmission right) in accordance with the CSMA/CA or the like, the frame containing the relevant data (more specifically, the physical packet having the physical header added thereto) via the transmitter 202 and the antenna 1. In the case of the MU-MIMO, the packet is transmitted after elapse of a certain time period from receiving the trigger frame. The physical header of the packet is set to the space separation signal which is specified in the trigger frame or specified in advance.

The transmitter 202 subjects the frame input from the controller 201 to DA conversion, a filtering process to extract components of a desired band, frequency conversion (up-conversion) and the like to amplify signals obtained through these processes by a pre-amplifier and radiate the amplified signals as radio waves from one or more antennas into the space. In a case where the plural antennas are included, the frame may be transmitted by way of beam forming.

The signal received by the antenna 1 is processed in the receiver 203. The received signal is amplified in the receiver 203 by the LNA, subjected to frequency conversion (down-conversion) and a filtering process to extract components of the desired band. The extracted signals are further converted into digital signals through AD conversion and output to the controller 201. The controller 201 performs demodulation, error-correcting decode, and a process of the physical header, and the frame are such as the data frame (including the frame received by way of the DL-MU-MIMO) are acquired. In the case of the OFDMA, the signal components of the resource unit for the device of itself are extracted to be subjected to the processes such as demodulation. If a receiver address (Address 1) of the MAC header of the frame matches the MAC address of the terminal of itself, the relevant frame is processed at the frame directed to the terminal of itself. If not match, the relevant frame is discarded.

The controller 201 carries out the CRC check of the received frame (in a case of the aggregation frame, the CRC check is carried out for the plural data frames in the aggregation frame). The controller 201 transmits the acknowledgement response frame via the transmitter 202 after elapse of a certain time period such as the SIFS from the completion of receiving the frame. If the controller 201 receives the RTS frame from the access point, it transmits, as the acknowledgement response frame with respect to it, the CTS frame.

If the controller 201 transmits the frame such as the data frame to the access point, it receives via the receiver 203 the acknowledgement response frame (such as the ACK frame or the BA frame) transmitted from the access point after elapse of a certain time period such as the SIFS from the completion of the transmission. The controller 201 determines whether or not the data frame (the individual aggregated data frames in a case of the aggregation frame) is successfully transmitted on the basis of the acknowledgement response frame.

The controller 201 may access a storage device that stores either information to be notified to the access point or the information notified from the access point or both of these pieces of information and read the information. The storage device may be an internal memory device, an external memory device, a volatile memory device, or a non-volatile memory. Also, the storage devices such as an SSD and a hard disk may be used in place of the memory device.

The above described isolation of the processes of the controller 201 and the transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion. Isolation other than those described above may be used.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

The terminal (non-AP station) may include a plurality of antennas each having directivity controllable to control the directivity for the antenna.

Second Embodiment

Figure 23:
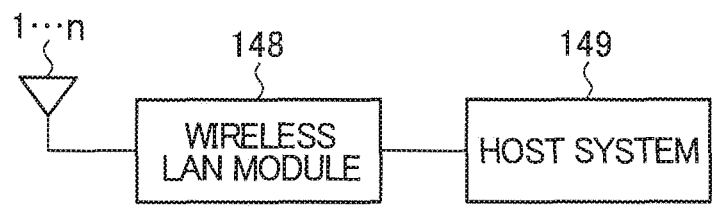
FIG. 23 is a diagram showing an exemplary overall configuration of a terminal or an access point.

FIG. 23 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 24:
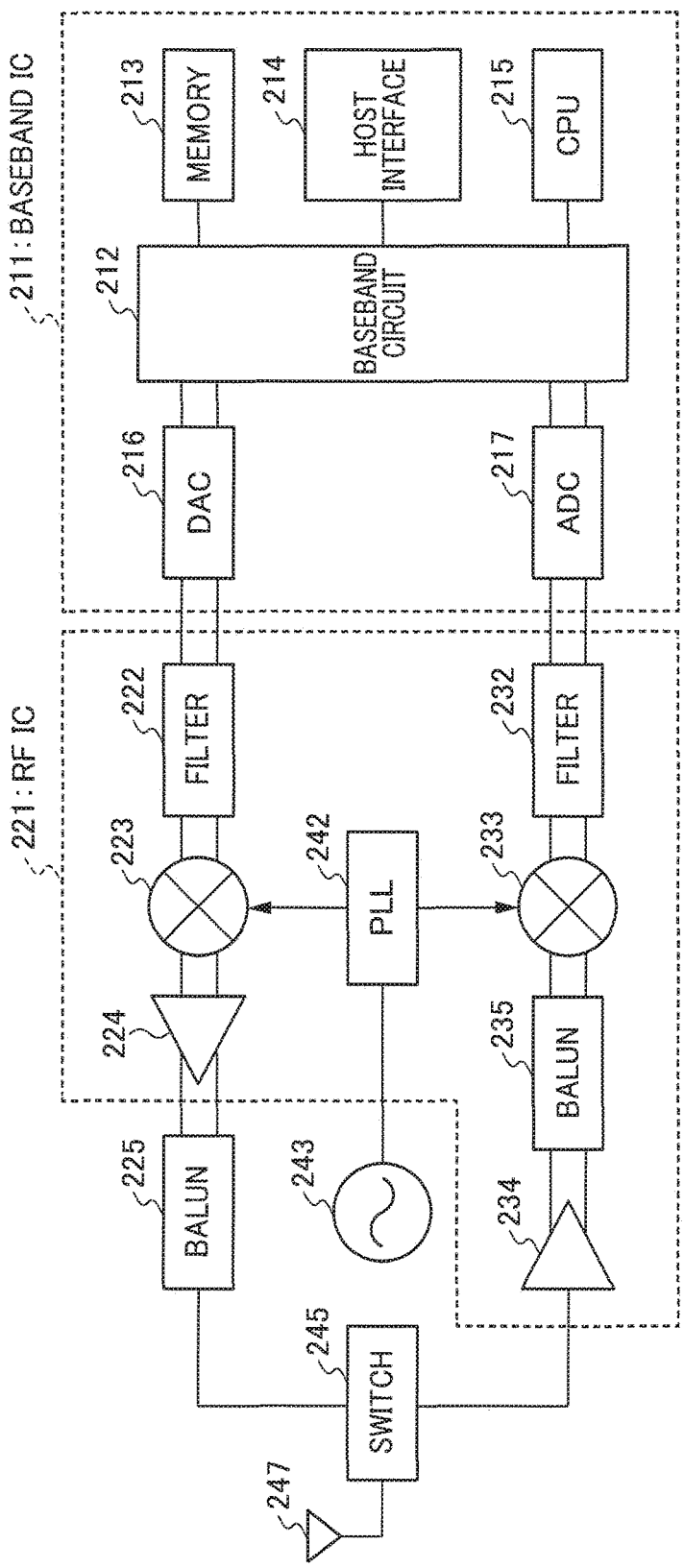
FIG. 24 is a diagram showing an exemplary hardware configuration of a wireless communication device equipped at an access point or a terminal according to a third embodiment.

FIG. 24 shows an example of hardware configuration of a wireless LAN module. The configuration can also be applied when the wireless communication device (or a wireless device) is mounted on either one of the terminal that is a non-base station and the base station. Therefore, the configuration can be applied as an example of specific configuration of the wireless communication device shown in FIG. 1. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The detailed description of the process of the above-described components is obvious from the description of the first embodiment, and therefore redundant descriptions will be omitted.

Third Embodiment

Figure 25:
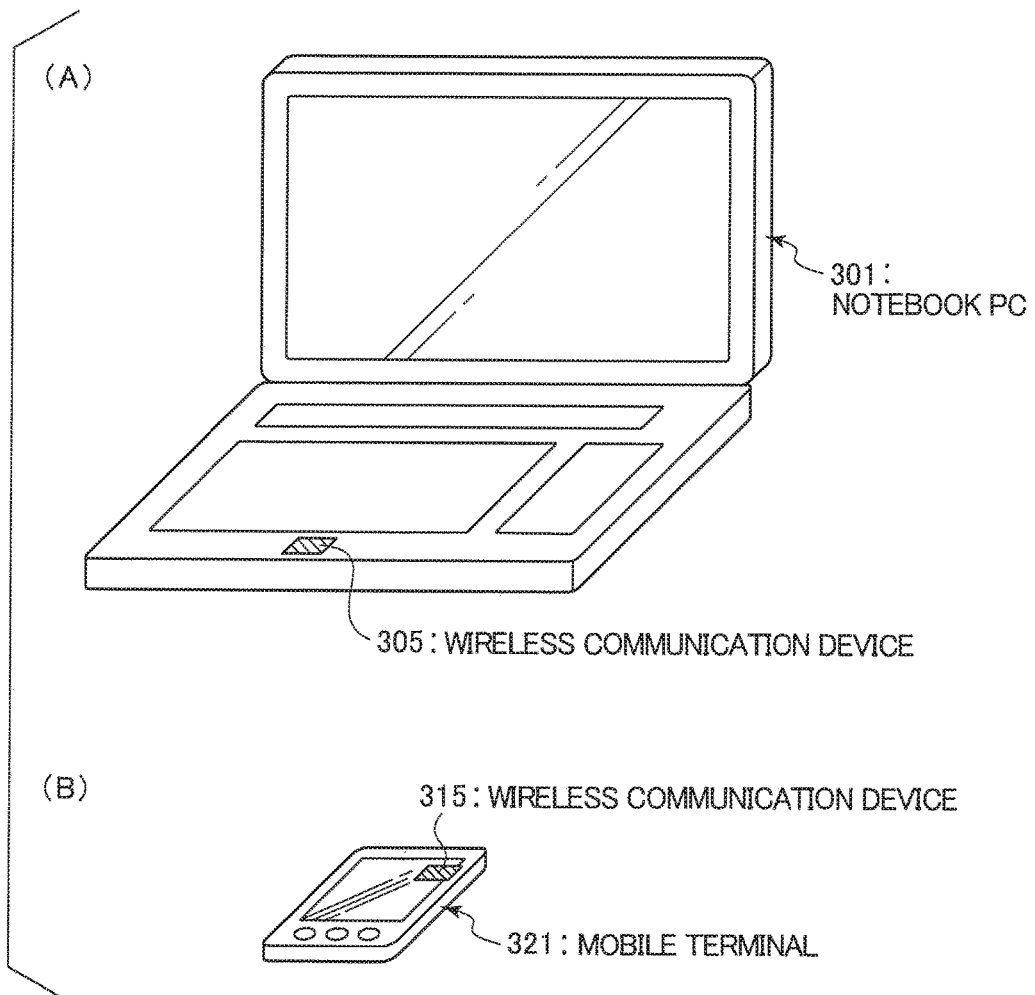
FIG. 25 is a perspective view of a terminal according to a fourth embodiment.
Figure 26:
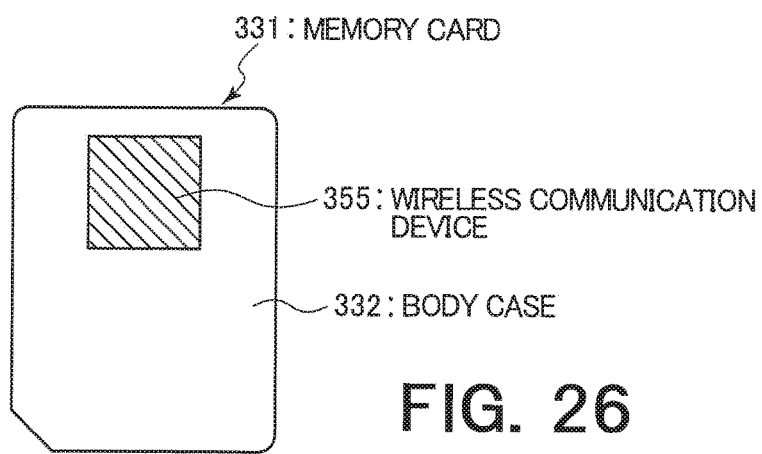
FIG. 26 is a diagram showing a memory card according to the fourth embodiment.

FIG. 25(A) and FIG. 25(B) are perspective views of wireless terminal according to the third embodiment. The wireless terminal in FIG. 25(A) is a notebook PC 301 and the wireless communication device (or a wireless device) in FIG. 25(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 27:
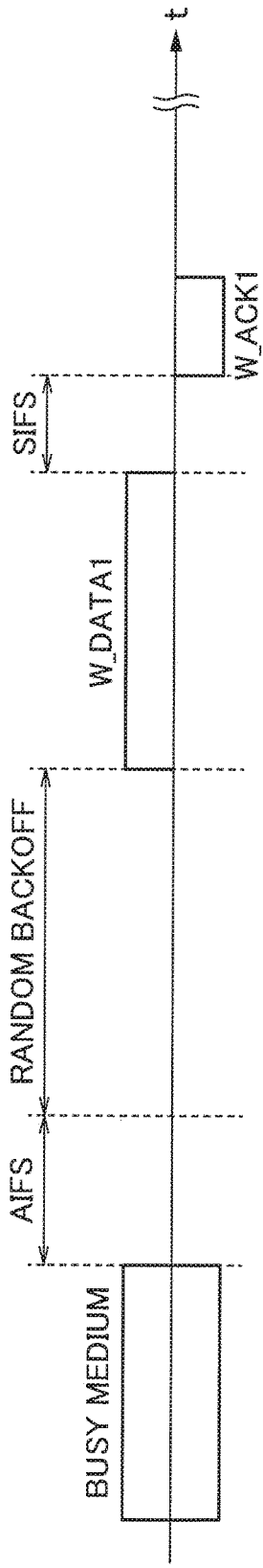
FIG. 27 is a diagram showing an example of frame exchange during a contention period.

Moreover, a wireless communication device installed in a terminal (which may indicate a base station) can also be provided in a memory card. FIG. 27 illustrates an example of a wireless communication device mounted on a memory card. A memory card 331 contains a wireless communication device 355 and a body case 332. The memory card 331 uses the wireless communication device 355 for wireless communication with external devices. Here, in FIG. 27, the description of other installed elements (for example, a memory, and so on) in the memory card 331 is omitted.

Fourth Embodiment

In the fourth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fifth Embodiment

In the fifth embodiment, a clock generating unit is provided in addition to the configuration of the wireless communication device of the terminal (which may indicate the base station) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Sixth Embodiment

In the sixth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Seventh Embodiment

In the seventh embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eighth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Ninth Embodiment

In the ninth embodiment, an LED unit is added to the configuration of the wireless communication device of the terminal (which may indicate the base station) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Tenth Embodiment

In the tenth embodiment, a vibrator unit is included in addition to the configuration of the wireless communication device wireless communication device of the terminal (which may indicate the base station) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Eleventh Embodiment

In an eleventh embodiment, the configuration of the wireless communication device includes a display in addition to the configuration of the wireless communication device (the wireless communication device of the terminal (which may indicate the base station) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Twelfth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successfully shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are six types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Here, FIG. 27 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The frames multiplexing-transmitted by the plurality of terminals may be the same (for example, the same type or the same content) or may be different. Generally, when it is expressed that the plurality of terminals transmits or receives X-th frames, the X-th frames may be the same or may be different. An arbitrary value can be put into X according to the situation.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a receiver configured to receive a first frame which contains data, a sender device of the first frame being a first relay station; and
   a transmitter configured to transmit a second frame and a third frame by multiuser frequency multiplexing, the second frame containing the data and being addressed to a second relay station different from the first relay station, and the third frame being addressed to the first relay station and being an acknowledgement response frame on the first frame, wherein:
   the receiver is configured to receive a fourth frame before the first frame,
   the fourth frame is a frame to give transmission authorization by the first relay station to a second wireless communication device belonging to the first relay station, and
   the transmitter is configured to transmit a fifth frame on basis of the fourth frame before receiving the first frame, the fifth frame instructing a third wireless communication device belonging to the own device to restrain a transmission operation.

2. The wireless communication device according to claim 1, wherein
   a frequency band for transmission of the second frame is broader than a frequency band for transmission of the third frame.

3. The wireless communication device according to claim 1, wherein
   a number of hops of the own device from a wired network is larger than that of the second relay station and smaller than that of the first relay station.

4. The wireless communication device according to claim 1, further comprising at least one antenna.

5. A wireless communication device comprising:
a receiver configured to receive a first frame which contains data, a sender device of the first frame being a first relay station; and
a transmitter configured to transmit a second frame and a third frame by multiuser frequency multiplexing,
the second frame containing the data and being addressed to a second relay station different from the first relay station, and
third frame being addressed to the first relay station, wherein the receiver is configured to receive a fourth frame before the first frame, the fourth frame is a frame to give transmission authorization by the first relay station to a second wireless communication device belonging to the first relay station,
the transmitter is configured to transmit a fifth frame on basis of the fourth frame before receiving the first frame, with directivity of an antenna oriented to a direction of a third wireless communication device belonging to the own device, the fifth frame instructing the third wireless communication device belonging to the own device to restrain a transmission operation.

6. A wireless communication device comprising:
a receiver configured to receive a first frame which contains data, a sender device of the first frame being a first relay station;
a transmitter configured to transmit a second frame and a third frame by multiuser frequency multiplexing,
the second frame containing the data and being addressed to a second relay station different from the first relay station, and
the third frame being addressed to the first relay station; and
controlling circuitry, wherein
the receiver is configured to receive a fourth frame before the first frame,
the fourth frame is a frame to give transmission authorization by the first relay station to a second wireless communication device belonging to the first relay station; and
the controlling circuitry, after receiving the fourth frame and before receiving the first frame, is configured to control a directivity of an antenna to be oriented to a direction of the first relay station.

7. A wireless communication device, comprising:
a receiver configured to receive a first frame which contains data, a sender device of the first frame being a first relay station; and
a transmitter configured to transmit a second frame and a third frame by multiuser frequency multiplexing,
the second frame containing the data and being addressed to a second relay station different from the first relay station, and
the third frame being addressed to the first relay station; wherein
the receiver is configured to receive a fourth frame before the first frame,
the fourth frame is a frame to give authorization of multiuser multiplexing transmission to a plurality of second wireless communication devices belonging to the first relay station, and
the transmitter is configured to transmit a fifth frame on basis of the fourth frame before receiving the first frame, the fifth frame instructing a third wireless communication device belonging to the own device to restrain a transmission operation.

8. A wireless communication method performed by a wireless communication device comprising:
receiving a first frame which contains data, a sender device of the first frame being a first relay station;
transmitting a second frame and a third frame by multiuser frequency multiplexing, wherein:
the second frame containing the data and being addressed to a second relay station different from the first relay station, and
the third frame being addressed to the first relay station and being an acknowledgement response frame on the first frame;
receiving a fourth frame before the first frame, the fourth frame being a frame to give transmission authorization by the first relay station to a second wireless communication device belonging to the first relay station; and
transmitting a fifth frame on basis of the fourth frame before receiving the first frame, the fifth frame instructing a third wireless communication device belonging to the own device to restrain a transmission operation.

9. The wireless communication method according to claim 8, wherein the fifth frame is transmitted with directivity of an antenna oriented to a direction of the third wireless communication device belonging to the own device.

10. The wireless communication method according to claim 8, wherein
the fourth frame is a frame to give authorization of multiuser multiplexing transmission to a plurality of second wireless communication devices belonging to the first relay station.

11. The wireless communication method according to claim 8, wherein
a frequency band for transmission of the second frame is broader than a frequency band for transmission of the third frame.

12. The wireless communication method according to claim 8, wherein
a number of hops of the own device from a wired network is larger than that of the second relay station and smaller than that of the first relay station.

13. A wireless communication method performed by a wireless communication device comprising:
receiving a first frame which contains data, a sender device of the first frame being a first relay station;
transmitting a second frame and a third frame by multiuser frequency multiplexing, wherein:
the second frame containing the data and being addressed to a second relay station different from the first relay station, and
the third frame being addressed to the first relay station and being an acknowledgement response frame on the first frame;
receiving a fourth frame before the first frame, the fourth frame being a frame to give transmission authorization by the first relay station to a second wireless communication device belonging to the first relay station; and
controlling, after receiving the fourth frame and before receiving the first frame, a directivity of an antenna to be oriented to a direction of the first relay station.

* * * * *